US012750704B2

(12) United States Patent
Zhang et al.

(10) Patent No.: US 12,750,704 B2
(45) Date of Patent: Sep. 29, 2026

(54) INTER-USER-EQUIPMENT CROSS-LINK INTERFERENCE MEASUREMENT

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/819,673

(22) Filed: Aug. 15, 2022

(65) Prior Publication Data

US 2024/0314596 A1 Sep. 19, 2024

(51) Int. Cl.
*H04W 24/08* (2009.01)
*H04L 5/00* (2006.01)

(52) U.S. Cl.
CPC .......... *H04W 24/08* (2013.01); *H04L 5/0048* (2013.01); *H04L 5/0096* (2013.01)

(58) Field of Classification Search
CPC ............ H04W 24/08; H04W 72/1268; H04W 72/542; H04W 80/02; H04W 72/21; H04W 72/541; H04L 5/0048; H04L 5/0096; H04L 5/0073; H04B 17/328; H04B 17/336; H04B 17/345
See application file for complete search history.

(56) References Cited

U.S. PATENT DOCUMENTS

| | | | | |
|---|---|---|---|---|
| 2020/0229009 | A1* | 7/2020 | Xu | H04B 17/345 |
| 2023/0337029 | A1* | 10/2023 | Tang | H04W 24/10 |
| 2023/0370856 | A1* | 11/2023 | Selvaganapathy | H04W 16/14 |
| 2024/0323936 | A1* | 9/2024 | You | H04L 5/14 |
| 2024/0323954 | A1* | 9/2024 | Li | H04W 72/1268 |
| 2025/0344086 | A1* | 11/2025 | Shim | H04J 11/0026 |

OTHER PUBLICATIONS

Pedersen et al, "Advancements in 5G New Radio TDD Cross Link Interference Mitigation", IEEE, 2020 (Year: 2020).*

* cited by examiner

*Primary Examiner* — Omer S Mian
(74) *Attorney, Agent, or Firm* — Harrity & Harrity LLP/QUALCOMM Incorporated

(57) ABSTRACT

Various aspects of the present disclosure generally relate to wireless communication. In some aspects, a first user equipment (UE) may communicate using a first subcarrier spacing (SCS). The UE may switch from the first SCS to a second SCS for reception, from a second UE associated with the second SCS, of a reference signal for inter-UE cross-link interference (CLI) measurement. The UE may switch back to the first SCS after receiving the reference signal. Numerous other aspects are described.

30 Claims, 13 Drawing Sheets

INTER-USER-EQUIPMENT CROSS-LINK INTERFERENCE MEASUREMENT

FIELD OF THE DISCLOSURE

Aspects of the present disclosure generally relate to wireless communication and to techniques and apparatuses for inter-user-equipment (inter-UE) cross-link interference (CLI) measurement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include identifying a first subcarrier spacing (SCS) of a first user equipment (UE), the first SCS associated with transmission of a reference signal for inter-UE cross-link interference (CLI) measurement. The method may include outputting a switching configuration for a second UE associated with a second SCS different than the first SCS, wherein the switching configuration indicates for the second UE to switch to the first SCS for reception of the reference signal for inter-UE CLI measurement.

Some aspects described herein relate to a method of wireless communication performed by a first UE. The method may include receiving a switching configuration, wherein the switching configuration indicates for the first UE to switch to a first SCS for reception, from a second UE associated with the first SCS, of a reference signal for inter-UE CLI measurement, wherein the first UE is associated with a second SCS different than the first SCS. The method may include receiving the reference signal for inter-UE CLI measurement using the first SCS. The method may include switching, after receiving the reference signal, to the second SCS in accordance with a rule.

Some aspects described herein relate to an apparatus for wireless communication. The apparatus may include means for identifying a first SCS of a first UE, the first SCS associated with transmission of a reference signal for inter-UE CLI measurement. The apparatus may include means for outputting a switching configuration for a second UE associated with a second SCS different than the first SCS, wherein the switching configuration indicates for the second UE to switch to the first SCS for reception of the reference signal for inter-UE CLI measurement.

Some aspects described herein relate to an apparatus for wireless communication. The apparatus may include means for receiving a switching configuration, wherein the switching configuration indicates for the apparatus to switch to a first SCS for reception, from a second UE associated with the first SCS, of a reference signal for inter-UE CLI measurement, wherein the apparatus is associated with a second SCS different than the first SCS. The apparatus may include means for receiving the reference signal for inter-UE CLI measurement using the first SCS. The apparatus may include means for switching, after receiving the reference signal, to the second SCS in accordance with a rule.

Some aspects described herein relate to a network node for wireless communication. The network node may include memory, one or more processors coupled to the memory, and instructions stored in the memory and executable by the one or more processors. The instructions may be executable by the one or more processors to cause the network node to identify a first SCS of a first UE, the first SCS associated with transmission of a reference signal for inter-UE CLI measurement. The instructions may be executable by the one or more processors to cause the network node to output a switching configuration for a second UE associated with a second SCS different than the first SCS, wherein the switching configuration indicates for the second UE to switch to the first SCS for reception of the reference signal for inter-UE CLI measurement.

Some aspects described herein relate to a first UE for wireless communication. The first user equipment may include memory, one or more processors coupled to the memory, and instructions stored in the memory and executable by the one or more processors. The instructions may be executable by the one or more processors to cause the first user equipment to receive a switching configuration, wherein the switching configuration indicates for the first UE to switch to a first SCS for reception, from a second UE associated with the first SCS, of a reference signal for inter-UE CLI measurement, wherein the first UE is associated with a second SCS different than the first SCS. The instructions may be executable by the one or more processors to cause the first user equipment to receive the reference signal for inter-UE CLI measurement using the first SCS. The instructions may be executable by the one or more processors to cause the first user equipment to switch, after receiving the reference signal, to the second SCS in accordance with a rule.

Some aspects described herein relate to a non-transitory computer-readable medium that stores one or more instructions for wireless communication by a network node. The one or more instructions, when executed by one or more processors of the network node, may cause the network node to identify a first SCS of a first UE, the first SCS associated with transmission of a reference signal for inter-UE CLI measurement. The one or more instructions, when executed by one or more processors of the network node, may cause the network node to output a switching configuration for a second UE associated with a second SCS different than the first SCS, wherein the switching configuration indicates for the second UE to switch to the first SCS for reception of the reference signal for inter-UE CLI measurement.

Some aspects described herein relate to a non-transitory computer-readable medium that stores one or more instructions for wireless communication by a first UE. The one or more instructions, when executed by one or more processors of the UE, may cause the UE to receive a switching configuration, wherein the switching configuration indicates for the first UE to switch to a first SCS for reception, from a second UE associated with the first SCS, of a reference signal for inter-UE CLI measurement, wherein the first UE is associated with a second SCS different than the first SCS. The one or more instructions, when executed by one or more processors of the UE, may cause the UE to receive the reference signal for inter-UE CLI measurement using the first SCS. The one or more instructions, when executed by one or more processors of the UE, may cause the UE to switch, after receiving the reference signal, to the second SCS in accordance with a rule.

Some aspects described herein relate to a method of wireless communication performed by a first user equipment (UE). The method may include communicating using a first subcarrier spacing (SCS). The method may include switching from the first SCS to a second SCS for reception, from a second UE associated with the second SCS, of a reference signal for inter-UE cross-link interference (CLI) measurement. The method may include switching back to the first SCS after receiving the reference signal.

Some aspects described herein relate to a method of wireless communication performed by a network node. The method may include identifying a first subcarrier spacing (SCS) of a first user equipment (UE), the first SCS associated with transmission of a reference signal for inter-UE cross-link interference (CLI) measurement. The method may include outputting at least one of a switching configuration, or an indication of a resource for the transmission of the reference signal for inter-UE CLI measurement, for a second UE associated with a second SCS different than the first SCS, wherein the switching configuration indicates for the second UE to switch to the first SCS for reception of the reference signal for inter-UE CLI measurement.

Some aspects described herein relate to a first user equipment (UE) for wireless communication. The first user equipment may include a memory and one or more processors coupled to the memory. The one or more processors may be configured to communicate using a first subcarrier spacing (SCS). The one or more processors may be configured to switch from the first SCS to a second SCS for reception, from a second UE associated with the second SCS, of a reference signal for inter-UE cross-link interference (CLI) measurement. The one or more processors may be configured to switch back to the first SCS after receiving the reference signal.

Some aspects described herein relate to a network node for wireless communication. The network node may include a memory and one or more processors coupled to the memory. The one or more processors may be configured to identify a first subcarrier spacing (SCS) of a first user equipment (UE), the first SCS associated with transmission of a reference signal for inter-UE cross-link interference (CLI) measurement. The one or more processors may be configured to output at least one of a switching configuration, or an indication of a resource for the transmission of the reference signal for inter-UE CLI measurement, for a second UE associated with a second SCS different than the first SCS, wherein the switching configuration indicates for the second UE to switch to the first SCS for reception of the reference signal for inter-UE CLI measurement.

Some aspects described herein relate to a non-transitory computer-readable medium that stores a set of instructions for wireless communication by a first user equipment (UE). The set of instructions, when executed by one or more processors of the UE, may cause the UE to communicate using a first subcarrier spacing (SCS). The set of instructions, when executed by one or more processors of the UE, may cause the UE to switch from the first SCS to a second SCS for reception, from a second UE associated with the second SCS, of a reference signal for inter-UE cross-link interference (CLI) measurement. The set of instructions, when executed by one or more processors of the UE, may cause the UE to switch back to the first SCS after receiving the reference signal.

Some aspects described herein relate to a non-transitory computer-readable medium that stores a set of instructions for wireless communication by a network node. The set of instructions, when executed by one or more processors of the network node, may cause the network node to identify a first subcarrier spacing (SCS) of a first user equipment (UE), the first SCS associated with transmission of a reference signal for inter-UE cross-link interference (CLI) measurement. The set of instructions, when executed by one or more processors of the network node, may cause the network node to output at least one of a switching configuration, or an indication of a resource for the transmission of the reference signal for inter-UE CLI measurement, for a second UE associated with a second SCS different than the first SCS, wherein the switching configuration indicates for the second UE to switch to the first SCS for reception of the reference signal for inter-UE CLI measurement.

Some aspects described herein relate to an apparatus for wireless communication. The apparatus may include means for communicating using a first subcarrier spacing (SCS). The apparatus may include means for switching from the first SCS to a second SCS for reception, from a second user equipment (UE) associated with the second SCS, of a reference signal for inter-UE cross-link interference (CLI) measurement. The apparatus may include means for switching back to the first SCS after receiving the reference signal.

Some aspects described herein relate to an apparatus for wireless communication. The apparatus may include means for identifying a first subcarrier spacing (SCS) of a first user equipment (UE), the first SCS associated with transmission of a reference signal for inter-UE cross-link interference (CLI) measurement. The apparatus may include means for outputting at least one of a switching configuration, or an indication of a resource for the transmission of the reference signal for inter-UE CLI measurement, for a second UE associated with a second SCS different than the first SCS, wherein the switching configuration indicates for the second UE to switch to the first SCS for reception of the reference signal for inter-UE CLI measurement.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
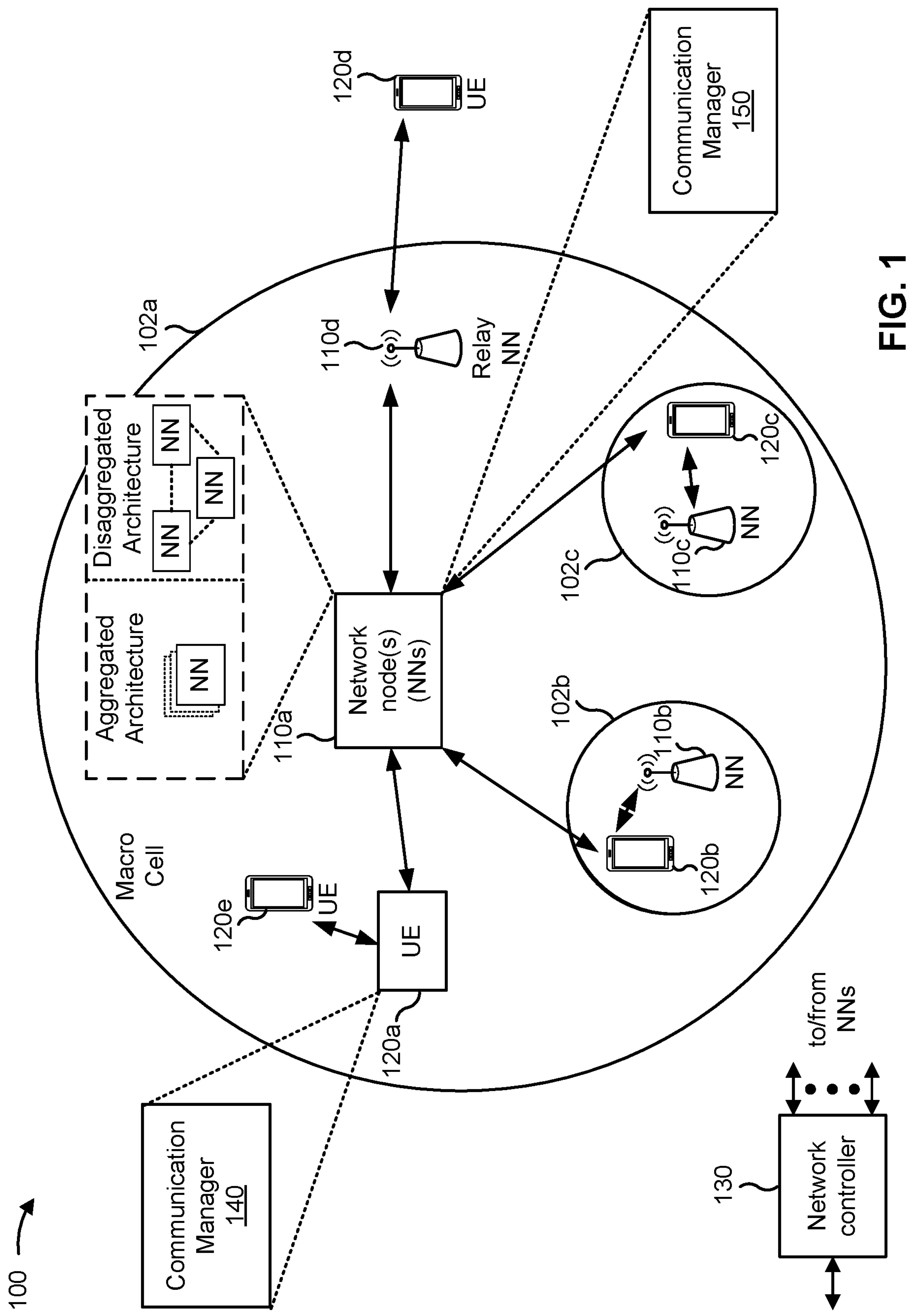
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., network node 110) may include a communication manager 150. As described in more detail elsewhere herein, the communication manager 150 may identify a first subcarrier spacing (SCS) of a first UE, the first SCS associated with transmission of a reference signal for inter-UE cross-link interference (CLI) measurement; and output a switching configuration for a second UE associated with a second SCS different than the first SCS, wherein the switching configuration indicates for the second UE to switch to the first SCS for reception of the reference signal for inter-UE CLI measurement. Additionally, or alternatively, the communication manager 150 may perform one or more other operations described herein.

In some aspects, a UE (e.g., the UE 120) may include a communication manager 140. As described in more detail elsewhere herein, the communication manager 140 may receive a switching configuration, wherein the switching configuration indicates for the UE to switch to a first SCS for reception, from a second UE associated with the first SCS, of a reference signal for inter-UE CLI measurement, wherein the UE is associated with a second SCS different than the first SCS; receive the reference signal for inter-UE CLI measurement using the first SCS; and switch, after receiving the reference signal, to the second SCS in accordance with a rule. Additionally, or alternatively, the communication manager 140 may perform one or more other operations described herein.

As indicated above, FIG. 1 is provided as an example. Other examples may differ from what is described with regard to FIG. 1.

Figure 2:
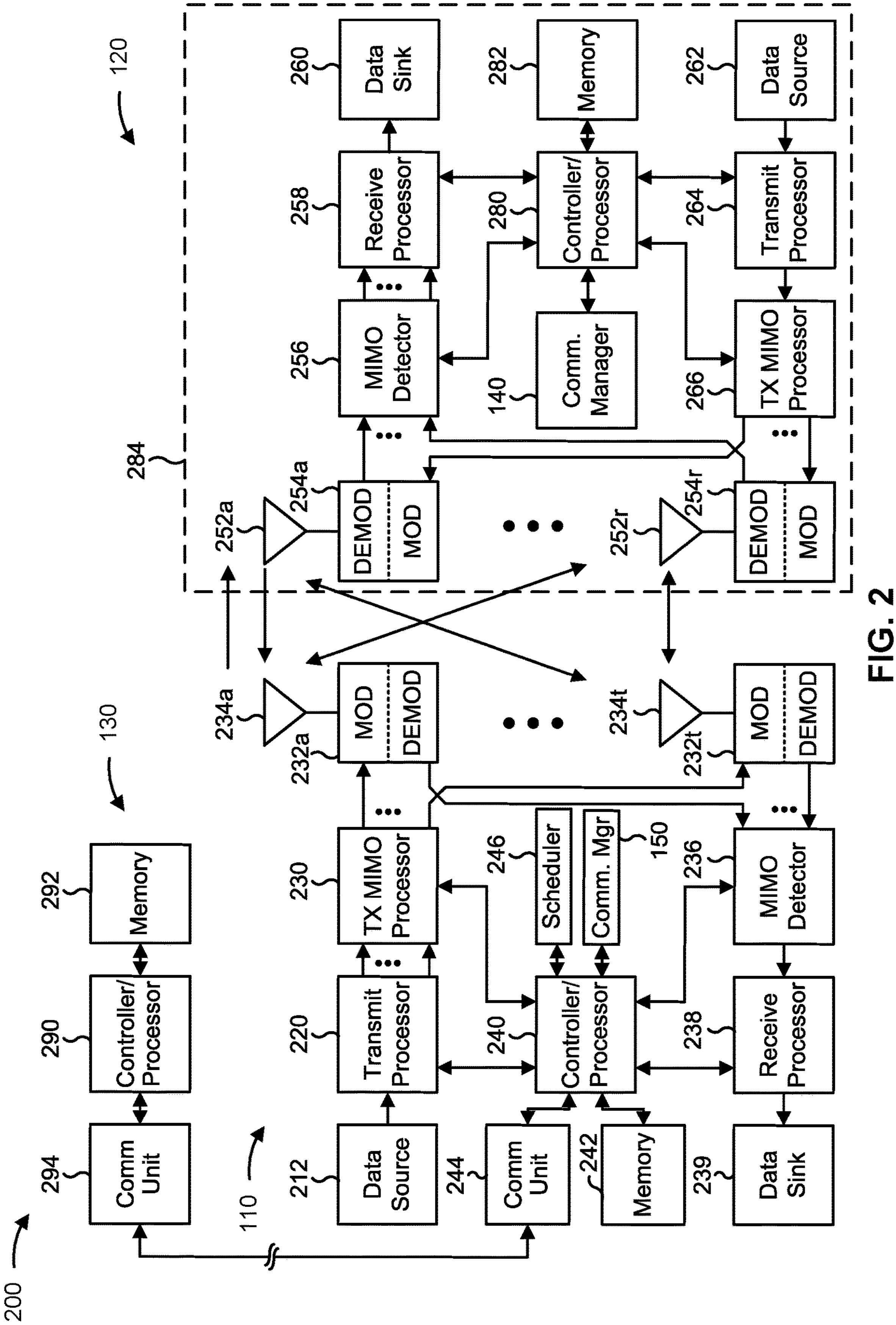
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., Toutput symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with CLI measurement, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the network node 110) includes means for identifying a first SCS of a first UE, the first SCS associated with transmission of a reference signal for inter-UE CLI measurement; means for identifying a first subcarrier spacing (SCS) of a first user equipment (UE), the first SCS associated with transmission of a reference signal for inter-UE cross-link interference (CLI) measurement; means for outputting at least one of a switching configuration, or an indication of a resource for the transmission of the reference signal for inter-UE CLI measurement, for a second UE associated with a second SCS different than the first SCS, wherein the switching configuration indicates for the second UE to switch to the first SCS for reception of the reference signal for inter-UE CLI measurement; and/or means for outputting a switching configuration for a second UE associated with a second SCS different than the first SCS, wherein the switching configuration indicates for the second UE to switch to the first SCS for reception of the reference signal for inter-UE CLI measurement. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first UE (e.g., UE 120) includes means for receiving a switching configuration, wherein the switching configuration indicates for the first UE to switch to a first SCS for reception, from a second UE associated with the first SCS, of a reference signal for inter-UE CLI measurement, wherein the first UE is associated with a second SCS different than the first SCS; means for receiving the reference signal for inter-UE CLI measurement using the first SCS; means for communicating using a first subcarrier spacing (SCS); means for switching from the first SCS to a second SCS for reception, from a second UE associated with the second SCS, of a reference signal for inter-UE cross-link interference (CLI) measurement; means for switching back to the first SCS after receiving the reference signal; and/or means for switching, after receiving the reference signal, to the second SCS in accordance with a rule. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
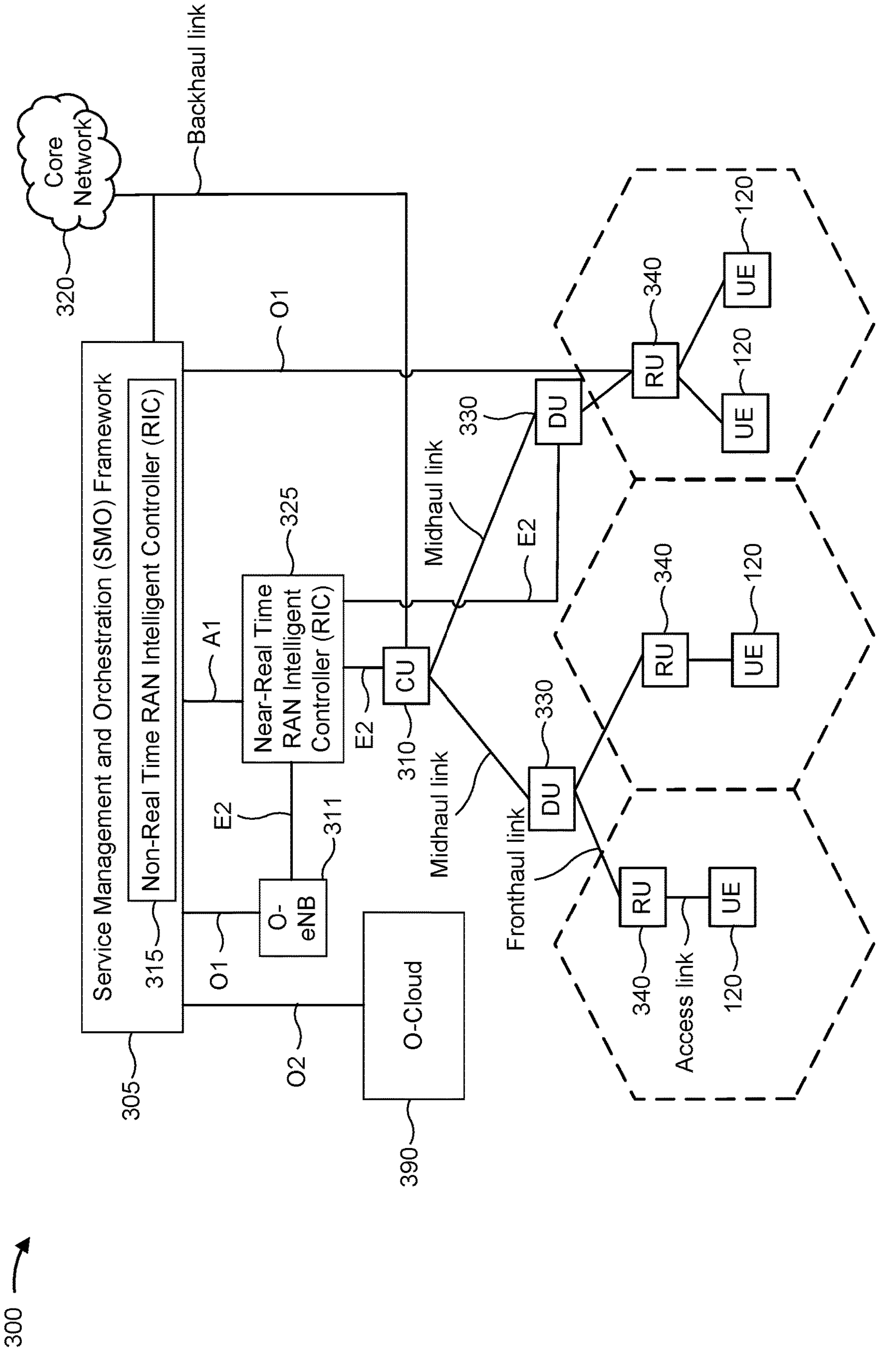
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIGS. 4A-4D are diagrams illustrating examples 400, 410, 420, 430 of full duplex (FD) communication in accordance with the present disclosure. An FD communication is a communication that utilizes overlapped time resources at a single node (such as a UE or a base station) for transmission and reception. For example, a UE or a network node may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states defining different beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

Figure 4A:
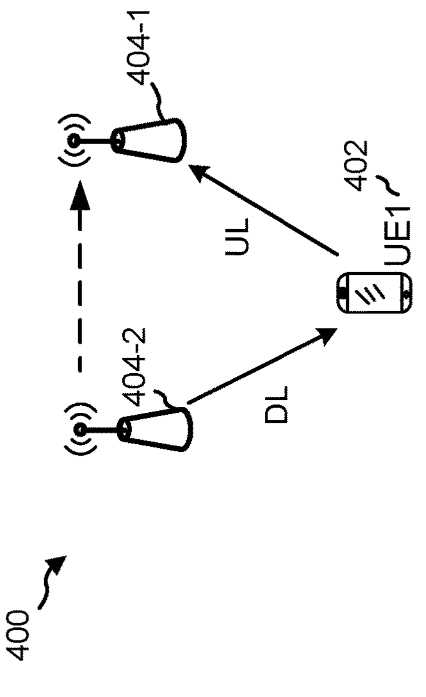
FIGS. 4A-4D are diagrams illustrating examples of full duplex (FD) communication in accordance with the present disclosure.

The example 400 of FIG. 4A includes a UE1 402 and two network nodes (e.g., TRPs) 404-1, 404-2, wherein the UE1 402 is sending uplink transmissions to the network node 404-1 and is receiving downlink transmissions from the network node 404-2. In some aspects, the network node 404 described in connection with FIGS. 4A-4D may be a base station, a TRP associated with (e.g., managed by) a network node, an RU, a DU, or a similar network node. In some aspects, the UEs 402 described in connection with FIGS. 4A-4D may be the UE 120 described in connection with FIGS. 1, 2, and 3, or a similar UE. In the example 400 of FIG. 4A, FD is enabled for the UE1 402, but not for the network nodes 404-1, 404-2. Thus, the network nodes 404-1 and 404-2 are half duplex (HD) network nodes.

Figure 4B:
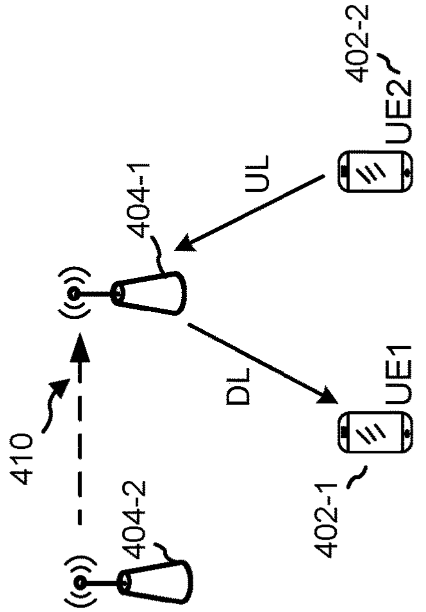

The example 410 of FIG. 4B includes two UEs, UE1 402-1 and UE2 402-2, a network node 404-1, and a network node 404-2. The UE1 402-1 is receiving a downlink transmission from the network node 404-1 and the UE2 402-2 is transmitting an uplink transmission to the network node 404-1. In the example 410 of FIG. 4B, FD is enabled for the network node 404-1, but not for the UE1 402-1 and UE2 402-2. Thus, the UE1 402-1 and UE2 402-2 are half duplex UEs.

Figure 4C:
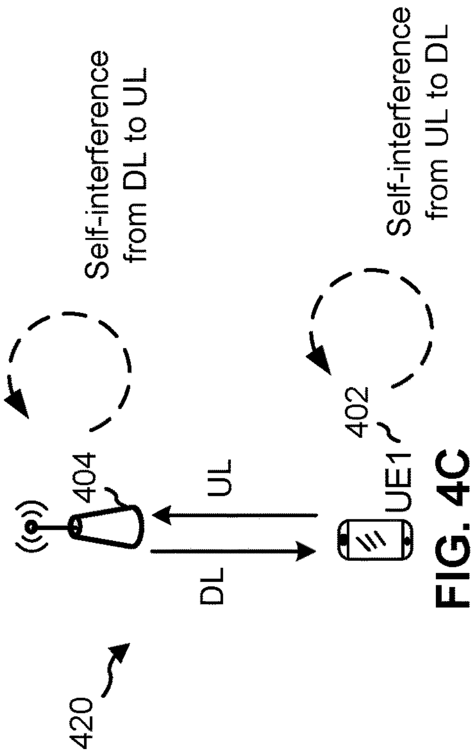

The example 420 of FIG. 4C includes a UE1 402 and a network node 404, wherein the UE1 402 is receiving a downlink transmission from the network node 404 and the UE1 402 is transmitting an uplink transmission to the network node 404. In the example 420 of FIG. 4C, FD is enabled for both the UE1 402 and the network node 404. In the example 420 of FIG. 4C, the UE1 402 and the network node 404 communicate using a beam pair. A beam pair may include a downlink beam and an uplink beam. For example, a UE1 402 may use a beam pair that includes a downlink beam (that is, a receive beam) at the UE1 402 and an uplink beam (that is, a transmit beam) at the UE1 402 to communicate with the network node 404. The network node 404 may use a downlink beam (that is, a transmit beam) at the network node 404 to transmit communications received via the UE1 402's downlink beam, and may use an uplink beam (that is, a receive beam) at the network node 404 to receive communications transmitted via the UE1 402's uplink beam.

Figure 4D:
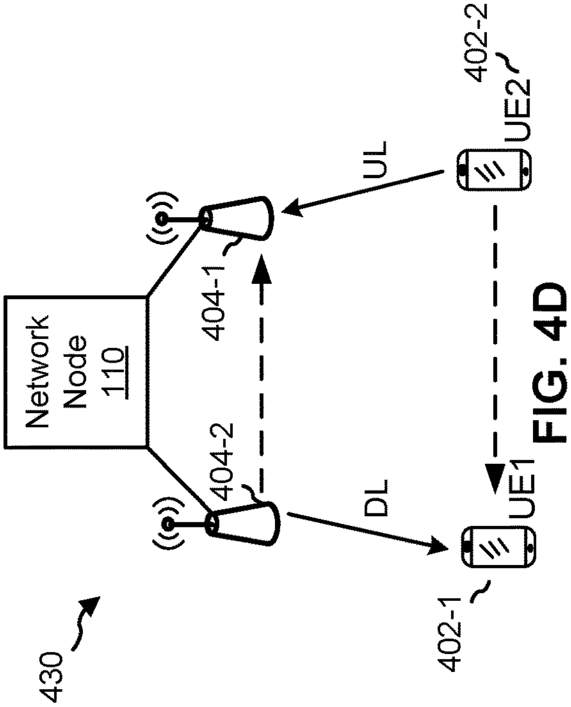

The example 430 of FIG. 4D includes a network node 110 and two network nodes 404-1 and 404-2 associated with a cell (such as, e.g., a cell 102 described in connection with FIG. 1). The network nodes 404-1 and 404-2 may be either co-located (e.g., located at the same device, such as at the network node 110 or other device), or may be non-co-located (e.g., located apart from one another and/or from the network node 110, and thus may be standalone devices).

In FIGS. 4A-4D, interference is indicated by dashed lines. Interference can occur between network nodes of examples 400, 410, 420, 430 (referred to as cross-link interference (CLI)). In FIG. 4A, network node 404-2's downlink transmission interferes with network node 404-1's uplink transmission. In FIG. 4B, network node 404-1's uplink reception may be subject to interference from a transmission by a network node 404-2. CLI between network nodes 404 is referred to herein as inter-network node CLI. In some examples in FIG. 4B, UE2 402-2's uplink transmission may interfere with UE1 402-1's downlink transmission (not shown). Similarly, in FIG. 4D, UE2 402-2's uplink transmission interferes with UE1 402-1's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 402 (from an uplink transmission to a downlink reception) and at a network node 404 (from a downlink transmission to an uplink reception) are shown in FIG. 4C. It should be noted that the above-described CLI and self-interference conditions can occur in HD deployments and in FD deployments.

Some network nodes support sub-band full duplex (SBFD) communication, as described below. SBFD communication may involve FD communication at a network node and HD communication at UEs, as shown, for example, in FIG. 4B.

As indicated above, FIGS. 4A-4D are provided as examples. Other examples may differ from what is described with regard to FIGS. 4A-4D.

Figure 5:
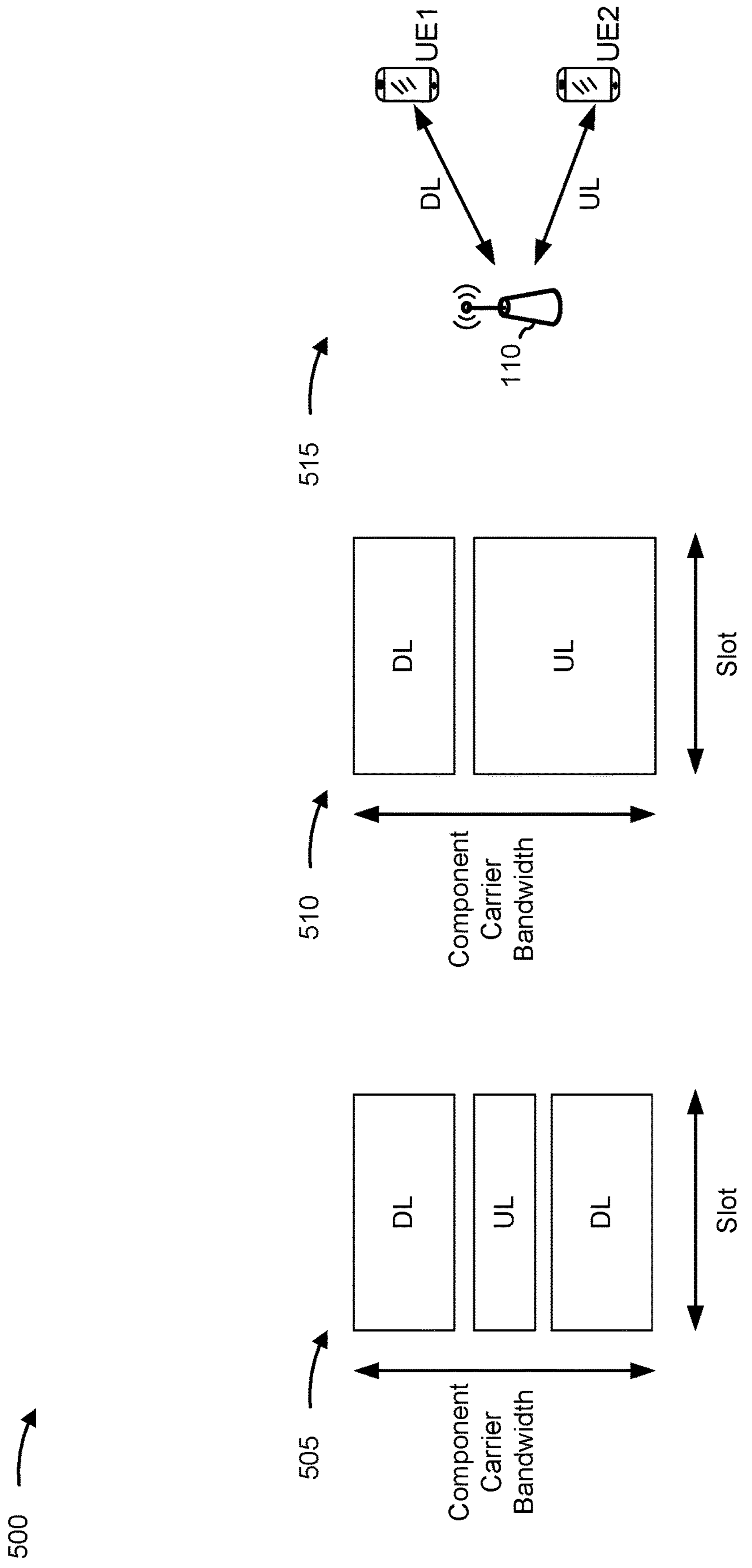
FIG. 5 is a diagram illustrating an example of sub-band FD (SBFD) resources and communication, in accordance with the present disclosure.

FIG. 5 is a diagram illustrating an example 500 of SBFD resources and communication, in accordance with the present disclosure. FIG. 5 shows examples 505 and 510 of SBFD resources, and an example 515 of a communication configuration between a network node 110 and UEs 1 and 2 (e.g., UEs 120) using an SBFD configuration.

An SBFD resource (that is, a resource having an SBFD format) may include one or more symbols and/or one or more slots. As mentioned above, an SBFD resource may include at least one uplink sub-band (that is, a sub-band used for uplink communication by a UE) and at least one downlink sub-band (that is, a sub-band used for downlink communication by a UE). Example 505 includes two non-contiguous downlink sub-bands and one uplink sub-band. Example 510 includes one downlink sub-band and one uplink sub-band. The two downlink sub-bands of example 505 may be used by a single UE, or may be used by different UEs (e.g., a first UE for a first downlink sub-band and a second UE for a second downlink sub-band). As mentioned above, a sub-band may include one or multiple consecutive resource blocks associated with a transmission direction. Here, example 505 includes two sub-bands associated with a downlink transmission direction and one sub-band associated with an uplink transmission direction, and example 510 includes one sub-band associated with a downlink transmission direction and one sub-band associated with an uplink transmission direction. Examples 505 and 510 may illustrate a symbol having an SBFD format (e.g., a symbol in which there is a set of resource blocks comprising at least one downlink sub-band and a set of resource blocks comprising at least one uplink sub-band), a slot having an SBFD format (e.g., a slot in which there is at least one downlink sub-band and at least one uplink sub-band), or another time resource having an SBFD format.

In a resource with an SBFD format, a network node 110 may perform simultaneous transmission of downlink transmissions and reception of uplink transmissions on a sub-band basis. For example, the network node 110 may simultaneously communicate with UE1 on the downlink and UE2 on the uplink. In some examples, UE1 and/or UE2 may be configured with only the sub-band(s) in use by UE1 and/or UE2 for communication. For example, UE1 may be configured with only downlink sub-bands, and UE2 may be configured with only uplink sub-bands of an SBFD formatted resource. This may be because, for example, UE1 and/or UE2 do not have a capability for SBFD communication. In some examples, UE1 and/or UE2 may be configured to utilize an SBFD formatted resource. For example, if a UE has a capability for SBFD communication, the UE may be aware that a given resource has an SBFD format (while utilizing the resource in only one transmission direction), or may perform FD communication in the given resource.

A resource can be configured to an SBFD format. In some aspects, a resource may be configured to an SBFD format based at least in part on an indication of a change of a format of the resource. For example, a network node may provide signaling indicating that the format of the resource is selected as an SBFD format (similarly to how signaling may indicate that the format is an uplink format, a downlink format, or a flexible format). As another example, a network node may configure one or more sub-bands of the resource such that the resource includes at least one uplink sub-band and at least one downlink sub-band. For example, a network node may reconfigure a sub-band of a slot with a downlink format to be an uplink sub-band, thereby converting the slot to have an SBFD format.

SBFD communication may provide an increased uplink duty cycle (relative to full-band communication), leading to latency reduction (since it is possible to receive downlink signaling in uplink slots) and uplink coverage improvement. Furthermore, SBFD communication may provide enhanced system capacity, resource utilization, and spectral efficiency. Still further, SBFD communication may enable flexible and dynamic uplink/downlink resource adaptation according to uplink/downlink traffic in a robust manner.

As indicated above, FIG. 5 is provided as an example. Other examples may differ from what is described with regard to FIG. 5.

Figure 6:
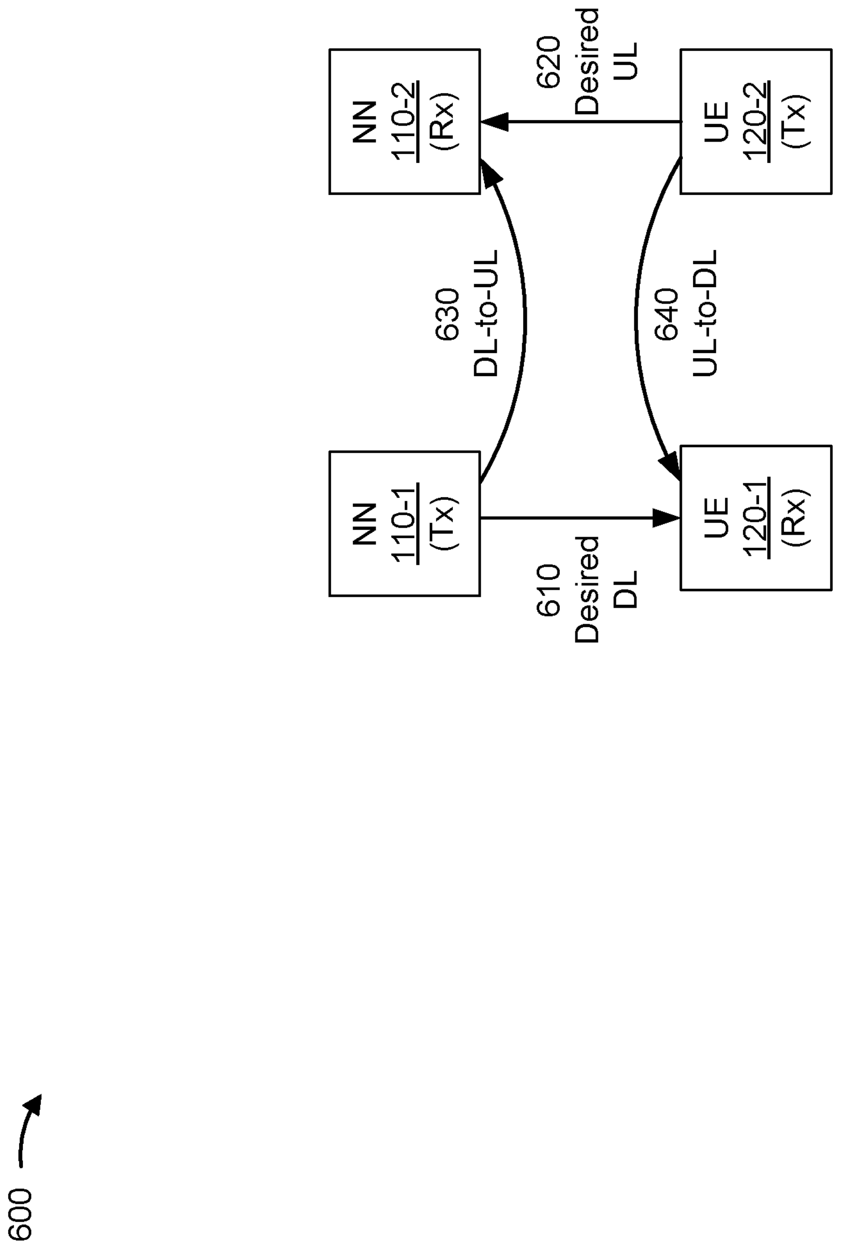
FIG. 6 is a diagram illustrating an example relating to cross-link interference (CLI) detection and mitigation, in accordance with the present disclosure.

FIG. 6 is a diagram illustrating an example 600 relating to CLI detection and mitigation, in accordance with the present disclosure.

In dynamic time division duplexing (TDD), the allocation of network resources to uplink communications and downlink communications may be dynamically modified depending on a traffic load. For example, a network node 110 may configure a TDD configuration (e.g., a TDD pattern) with more uplink transmission time intervals (TTIs) (e.g., frames, subframes, slots, mini-slots, and/or symbols) for a UE 120 when the UE 120 has uplink data to transmit, and may configure a TDD configuration with more downlink TTIs for the UE 120 when the UE 120 has downlink data to receive. The TDD configuration may be dynamically configured to modify the allocation of uplink TTIs and downlink TTIs used for communication between the network node 110 and the UE 120.

As shown in FIG. 6, when neighboring network nodes 110 (e.g., base stations, TRPs, RUs, cells) use different TDD configurations to communicate with UEs 120, this may result in a downlink communication 610 between a first network node 110-1 and a first UE 120-1 in a same TTI as an uplink communication 620 between a second network node 110-2 and a second UE 120-2. These communications in different transmission directions (e.g., downlink vs. uplink) in the same TTI may interfere with one another, which may be referred to as cross-link interference.

For example, as shown by reference number 630, the downlink communication 610 transmitted by the first network node 110-1 may be received by the second network node 110-2, and may interfere with reception, by the second network node 110-2, of the uplink communication 620 from the second UE 120-2. This may be referred to as downlink-to-uplink (DL-to-UL) interference, base station to base station interference, or gNB-to-gNB interference.

Further, as shown by reference number 640, the uplink communication 620 transmitted by the second UE 120-2 may be received by the first UE 120-1, and may interfere with reception, by the first UE 120-1, of the downlink communication 610 from the first network node 110-1. This may be referred to as uplink-to-downlink (UL-to-DL) interference, UE-to-UE interference, or inter-cell CLI. This UE-to-UE interference may occur and/or may increase when the first UE 120-1 and the second UE 120-2 are in close proximity, and may be avoided or mitigated by preventing scheduling of the UEs 120 in different transmission directions in the same TTI. This interference may be due to inter-sub-band (inter-SB) interference in an SBFD resource, in which the first UE 120-1's uplink transmission on an uplink sub-band of the SBFD resource may interfere with the second UE 120-2's downlink reception on a downlink sub-band of the SBFD resource. Inter-cell CLI in an SBFD resource may be referred to as inter-SB inter-cell inter-UE CLI or inter-SB inter-cell CLI.

In some examples, an uplink communication transmitted by a first UE associated with a network node 110 may interfere with a downlink communication received by a second UE associated with the network node 110. For example, an uplink transmission of a first UE connected to a cell may interfere with a downlink reception of a second UE connected to the cell. This interference may be due to inter-SB interference in an SBFD resource, in which the first UE's uplink transmission on an uplink sub-band of the SBFD resource may interfere with the second UE's downlink reception on a downlink sub-band of the SBFD resource. This may be referred to as inter-SB intra-cell CLI.

Intra-cell CLI and inter-cell CLI can also occur in overlapped FD deployments, such as a deployment illustrated in FIG. 4A or 4C. An overlapped FD deployment is a deployment in which uplink communication resources (e.g., sub-bands) of a network node at least partially overlap with downlink communication resources (e.g., sub-bands) of the network node. One example of an overlapped FD deployment is a fully overlapped FD deployment, in which uplink communication resources and downlink communication resources are fully overlapped with one another.

As indicated above, FIG. 6 is provided as an example. Other examples are possible and may differ from what was described with respect to FIG. 6.

A signal transmitted by a first UE may interfere with reception at a second UE. The first UE may be referred to as an aggressor UE and the second UE may be referred to as a victim UE. For example, a signal transmitted by an aggressor UE may cause CLI (e.g., inter-SB intra-cell CLI, inter-SB inter-cell CLI, intra-cell CLI, or inter-cell CLI, among other examples) at a victim UE. A victim UE can measure CLI caused by an aggressor UE, such as based at least in part on a signal transmitted by the aggressor UE (such as a reference signal, a data transmission with a known transmit power, or another form of signal). Measuring CLI may assist with mitigating the CLI. For example, a network node may schedule the aggressor UE and/or the victim UE so that the CLI is mitigated or eliminated. As another example, the aggressor UE may decrease a transmit power associated with the CLI. As yet another example, the victim UE may perform interference mitigation (e.g., interference cancellation) based at least in part on measuring the CLI.

A UE may communicate using an SCS. An SCS may be indicated by a numerology, though SCSs can be configured independently of a numerology in some contexts. A numerology is a parameter that indicates at least an SCS (and which may also indicate other parameters such as a cyclic prefix length). An SCS can include, for example, 15 kHz, 30 kHz, 60 kHz, 120 kHz, 240 kHz, 480 kHz, 960 kHz, or other values. An SCS may define the frequency domain bandwidth and the time domain duration of a resource element. A resource element may have dimensions of 1 subcarrier in the frequency domain and 1 symbol in the time domain. So, for a numerology indicating a 15 kHz subcarrier spacing, a resource element may have a bandwidth of 15 kHz and a symbol length of ($1/15$)=0.067 ms. Increasing the SCS by a factor of 2 decreases the symbol length by a factor of 2. An SCS for communication by a UE can be indicated in system information, a configuration of a component carrier (CC), a configuration of a bandwidth part (BWP), a configuration of a reference signal transmission or reception, a configuration of a measurement resource for a reference signal, or the like. A BWP is a configured bandwidth that can be activated or deactivated for use by a UE. A UE may transmit uplink transmissions in an active uplink BWP. A UE may receive downlink transmissions in an active downlink BWP. A BWP is associated with a configuration that indicates at least the bandwidth, center frequency, and SCS of the BWP. A CC is a bandwidth used for communication by a UE. A UE can use multiple CCs concurrently, which may be referred to as "carrier aggregation," whereas a UE may typically use one uplink BWP and one downlink BWP at a time. A BWP may be contained within a CC.

Different UEs may use different SCSs. For example, a first UE may use a first SCS on a BWP and a second UE may use a second SCS on the BWP (e.g., the first UE and the second UE may be configured with BWPs with the same bandwidth and center frequency but different SCSs). As another example, a first UE may use a first SCS on a first BWP and a second UE may use a second SCS on a second BWP different than the first BWP. As another example, a first UE may use a first BWP on a first CC and a second UE may use a second BWP on a second CC. In these examples, the first UE and the second UE may be associated with the same cell, or may be associated with different cells.

In some cases, an aggressor UE may use a different SCS than a victim UE. For example, a victim UE receiving a downlink communication may use a first SCS, and an aggressor UE transmitting an uplink communication (interfering with the victim UE's reception of the downlink communication) may use a second SCS different than the first SCS. In SBFD or dynamic TDD scenarios, inter-UE CLI may occur between UEs with different SCSs (e.g., different numerologies). In such examples, difficulties may arise with regard to the measurement of CLI. For example, if the aggressor UE transmits a reference signal in one symbol with a 120 KHz uplink SCS, this reference signal may occupy less than an entire symbol at a victim UE measuring the reference signal, assuming that the victim UE uses a smaller SCS than 120 kHz. For example, if the victim UE uses an SCS of 60 kHz, the reference signal may occupy approximately one-half of a slot at the victim UE. Since CLI measurements may be configured at the slot granularity at the victim UE, the accuracy of reference signal measurement, for the purpose of CLI measurement, may be negatively impacted. For example, the discrepancy in the transmitted signal's SCS and the receiving UE's SCS may negatively affect the accuracy of CLI RSRP measurements, CLI RSSI measurements, or the like. Thus, interference mitigation may be negatively impacted.

Some techniques described herein provide configuration, of a UE (e.g., a victim UE), to switch to an SCS of a reference signal for inter-UE CLI measurement. For example, an aggressor UE may be associated with a first SCS and a victim UE may be associated with a second SCS. A network node may identify the first SCS at which the aggressor UE will transmit a reference signal for inter-UE CLI measurement. The network node may configure the victim UE to use the first SCS for reception of the reference signal (e.g., for inter-UE CLI measurement using the reference signal). The victim UE may switch to the first SCS for reception of the reference signal in accordance with the configuration. Thus, accuracy of inter-UE CLI measurements (such as RSRP measurements or RSSI measurements) is improved. In this way, interference mitigation is improved, since interference mitigation may be more effective when using accurate inter-UE CLI measurements.

Figure 7:
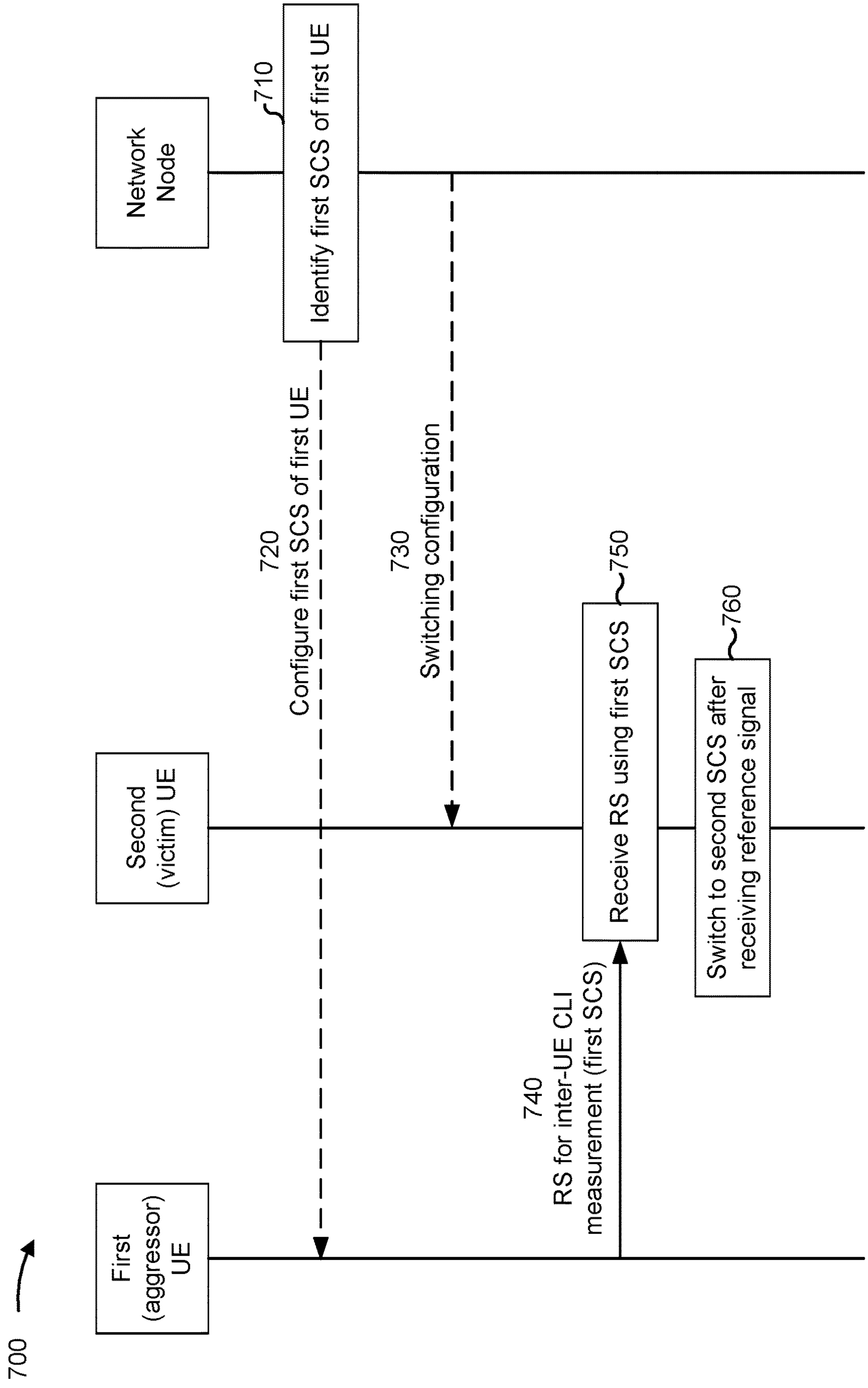
FIG. 7 is a diagram illustrating an example of signaling associated with inter-UE CLI measurement, in accordance with the present disclosure.

FIG. 7 is a diagram illustrating an example 700 of signaling associated with inter-UE CLI measurement, in accordance with the present disclosure. As shown, example 700 includes a first UE (e.g., UE 120, an aggressor UE), a second UE (e.g., UE 120, a victim UE), and a network node (e.g., network node 110). In some aspects, the network node may include multiple network nodes, as described with regard to FIGS. 1 and 3. For example, the multiple network nodes may perform actions, described herein as being performed by the network node, according to a functional split (described with regard to FIG. 3). As just one example, configuration actions (e.g., RRC signaling, F1 signaling) may be performed by a CU of the network node, scheduling actions (e.g., dynamic signaling, load balancing, etc.) may be performed by a DU of the network node, and radio communication (e.g., direct communication with UEs) may be performed by an RU of the network node.

In example 700, the first UE and the second UE are associated with the same network node. For example, the first UE and the second UE may be connected to a same cell associated with the network node. For example, the network node may be a serving network node of the first UE and the second UE. In some other aspects, the first UE may be associated with a different network node than the second UE. For example, the first UE may have a first serving network node and/or may be connected to a first cell, and the second UE may have a second serving network node different than the first serving network node and/or may be connected to a second cell different than the first cell. Thus, the techniques described herein can be applied for inter-cell CLI and for intra-cell CLI.

In some aspects, as described above, the first UE and the second UE may be associated with different network nodes. For example, the first UE may have a first serving network node and the second UE may have a second serving network node. In some aspects, the first serving network node and the second serving network node may communicate with one another, such as via backhaul communication (e.g., F1 signaling, Xn signaling, or a combination thereof) midhaul communication, over-the-air signaling, or the like. For example, if the first serving network node and the second serving network node (e.g., gNBs or DUs) are associated with (e.g., managed by) the same CU, then the first serving network node may transmit a communication to the second serving network node via F1 signaling to the CU, and the CU may provide the communication to the second serving network node (e.g., via F1 signaling). If the first serving network node is associated with (e.g., managed by) a first CU and the second serving network node is associated with (e.g., managed by) a second CU different than the first CU, then the first serving node may transmit a communication to the second network node via F1 signaling to the first CU, then Xn signaling between the first CU and the second CU, then F1 signaling from the second CU to the second serving network node.

In some aspects, the first serving network node may provide, to the second serving network node, a configuration associated with a reference signal for inter-UE CLI measurement. For example, a network node may provide, to another network node, a configuration (e.g., a sounding reference signal (SRS) configuration, among other examples) of a reference signal for inter-UE CLI measurement. In some aspects, the first serving network node may provide, to the second serving network node, information indicating an SCS of the first UE. Thus, network nodes (e.g., DUs, gNBs, or the like) may exchange, for example, reference signal configurations of UEs associated with the network nodes. In some aspects, receiving, by a network node from another network node, SCS information identifying an SCS of a UE (e.g., an SCS associated with transmission, by the UE, of a reference signal for inter-UE CLI measurement) may be referred to as identifying the SCS of the UE. These techniques for providing information regarding reference signals for inter-UE CLI measurement can be implemented irrespective of whether the techniques described below for switching a UE's SCS for reception of a reference signal for inter-UE CLI measurement are implemented.

As shown by reference number 710, the network node may identify a first SCS of the first UE (e.g., the aggressor UE). In some aspects, as described above, the network node may receive information identifying the first SCS (e.g., from another network node associated with the first UE, such as a serving network node of the first UE). In some other aspects, as shown by reference number 720, the network node may configure the first SCS of the first UE. For example, the network node may output a configuration of the first SCS for the first UE. As used herein, "outputting," in the context of a network node, can include transmission (e.g., directly to a UE 120) or provision to another network node (e.g., for direct or indirect transmission to the UE 120). The configuration may include, for example, a reference signal configuration indicating the first SCS (e.g., an SRS configuration indicating the first SCS), a BWP configuration indicating the first SCS, a CC configuration indicating the first SCS, a configuration of a channel indicating the first SCS, or another form of configuration (e.g., RRC information, medium access control (MAC) information, DCI, or a combination thereof). Thus, as used herein, "identifying the first SCS of the first UE" can include outputting a configuration of the first SCS or receiving information identifying the first SCS.

As shown by reference number 730, the network node may output a switching configuration for the second UE (e.g., the victim UE). For example, the network node may transmit information indicating the switching configuration to the second UE. As another example, the network node may provide the switching configuration to another network node (e.g., for transmission to the second UE). The switching configuration may indicate for the second UE to switch to the first SCS (that is, the SCS with which a reference signal for inter-UE CLI measurement is transmitted) for reception of a reference signal for inter-UE CLI measurement. In some aspects, the switching configuration may indicate one or more time resources (e.g., one or more symbols, slots, or the like) in which the reference signal is transmitted. In some aspects, the switching configuration may indicate a frequency resource (e.g., one or more resource elements, resource blocks, sub-bands, BWPs, or CCs) in which the reference signal is transmitted. In some aspects, the switching configuration may indicate one or more parameters associated with the reference signal, such as a sequence of the reference signal, a transmit power of the reference signal, a comb of the reference signal, a signal type of the reference signal, or the like. In some aspects, the switching configuration may include one or more parameters of a reference signal configuration (e.g., an SRS configuration) of the reference signal. In some aspects, the reference signal may be an SRS. In some aspects, the reference signal may be another form of signal. In some aspects, the reference signal may include a data transmission or a control transmission.

A network node (e.g., a serving network node of the second UE) may configure a second SCS for the second UE (e.g., for use prior to switching to the first SCS). In some aspects, the second SCS may be configured for the second UE by a different network node than the switching configuration. For example, a first network node (e.g., a serving network node of the second UE) may configure the second SCS (e.g., for a BWP, a CC, a communication, or the like), and a second network node may configure the switching configuration. In some aspects, the second network node may be a serving network node of the first UE (e.g., the aggressor UE). As used herein, a serving network node is a network node associated with an RRC connection with the UE, or a network node associated with a cell to which the UE is connected.

In some aspects, the switching configuration indicates for the second UE to switch an SCS of an active BWP (e.g., an active downlink BWP) of the second UE to the first SCS. For example, the switching configuration may indicate to change the SCS of the active BWP from a second SCS (which, in some examples, is configured for the active BWP) to the first SCS during a time resource in which the reference signal is to be received by the second UE.

In some aspects, the switching configuration indicates for the second UE to switch to a BWP associated with the first SCS. For example, the switching configuration may indicate for the second UE to switch from a first BWP associated with a second SCS, to a second BWP associated with the first SCS, so that the second UE's active BWP is the second BWP during a time resource in which the reference signal is received.

In some aspects, the switching configuration may indicate a gap associated with reception of the reference signal for inter-UE CLI measurement. Additionally, or alternatively, signaling (e.g., configuration information) other than the switching configuration may indicate the gap. A gap may include a time interval (e.g., a symbol, part of a symbol, multiple symbols) in which the second UE does not perform transmission. For example, the second UE may not transmit during the gap. In some aspects, the gap may be a switching gap. For example, the gap may be associated with switching from the second SCS (for communication prior to receiving the reference signal) to the first SCS (for reception of the reference signal), or may be associated with switching from a BWP associated with the second SCS to a BWP associated with the first SCS. In such examples, the UE may switch to the first SCS (or a BWP associated with the first SCS) during the gap. In some aspects, the gap may occur prior to the reception of the reference signal (e.g., the UE may switch from the second SCS to the first SCS during the gap). In some aspects, the gap may occur after the reception of the reference signal (e.g., the UE may switch from the first SCS to the second SCS during the gap). In some aspects, the gap, and/or parameters for determining the gap, may be specified. For example, a wireless communication specification may indicate whether the gap is to be used, a length of the gap, parameters for determining whether the gap is to be used and/or a length of the gap, whether the gap is to occur before (e.g., prior to) the reception of the reference signal, whether the gap is to occur after (e.g., following) the reception of the reference signal, or the like.

In some aspects, the network node may output an indication of a resource associated with the reference signal for inter-UE CLI measurement. For example, the network node may output, to the second UE, the indication. The indication may include, for example, a measurement configuration indicating the resource, an RRC configuration indicating the resource, or like. In some aspects, the indication may indicate for the second UE to measure the reference signal on the resource. In some aspects, the indication may indicate the first SCS, such that the second UE can switch to the second SCS, for reception (e.g., measurement) of the reference signal, in the resource. For example, the second UE may switch to the second SCS in accordance with a rule, such as a rule specified in a wireless communication specification. Thus, overhead is reduced relative to explicitly configuring the second UE to switch between the first SCS and the second SCS.

As shown by reference number 740, the first UE may transmit the reference signal for inter-UE CLI measurement using the first SCS. As shown by reference number 750, the second UE may receive the reference signal for inter-UE CLI measurement using the first SCS. For example, the second UE may switch to the first SCS (or a BWP associated with the first SCS) prior to receiving the reference signal. In some aspects, receiving the reference signal may include determining a measurement (e.g., an inter-UE CLI measurement, such as an RSRP or an RSSI based at least in part on a reference signal for inter-UE CLI measurement) based at least in part on the reference signal. For example, the UE may determine the measurement using a sample of a signal received during a resource configured for the reference signal.

As shown by reference number 760, in some aspects, the second UE may switch to the second SCS after receiving the reference signal. In some aspects, the second UE may switch to the second SCS autonomously (e.g., automatically). For example, the second UE may switch to the second SCS after a resource associated with the reference signal, in accordance with a rule specified in a wireless communication specification. As another example, the second UE may switch to the second SCS (or a BWP associated with the second SCS) without receiving signaling (e.g., signaling other than the switching configuration) indicating to switch back to the second SCS (or a BWP associated with the second SCS) after receiving the reference signal using the first SCS. In some aspects, the switching configuration may indicate to switch back to the second SCS (or a BWP associated with the second SCS) after receiving the reference signal. For example, the switching configuration may indicate a time resource in which the second UE is to receive the reference signal using the first SCS, and the second UE may switch to the first SCS for the time resource, and may switch back to the second SCS after the time resource has ended. In some aspects, the second UE may switch from the first SCS to the second SCS using automatic BWP switching, which is an operation in which the second UE switches an active BWP without receiving explicit signaling (e.g., DCI) indicating to switch the active BWP.

As indicated above, FIG. 7 is provided as an example. Other examples may differ from what is described with regard to FIG. 7.

Figure 8:
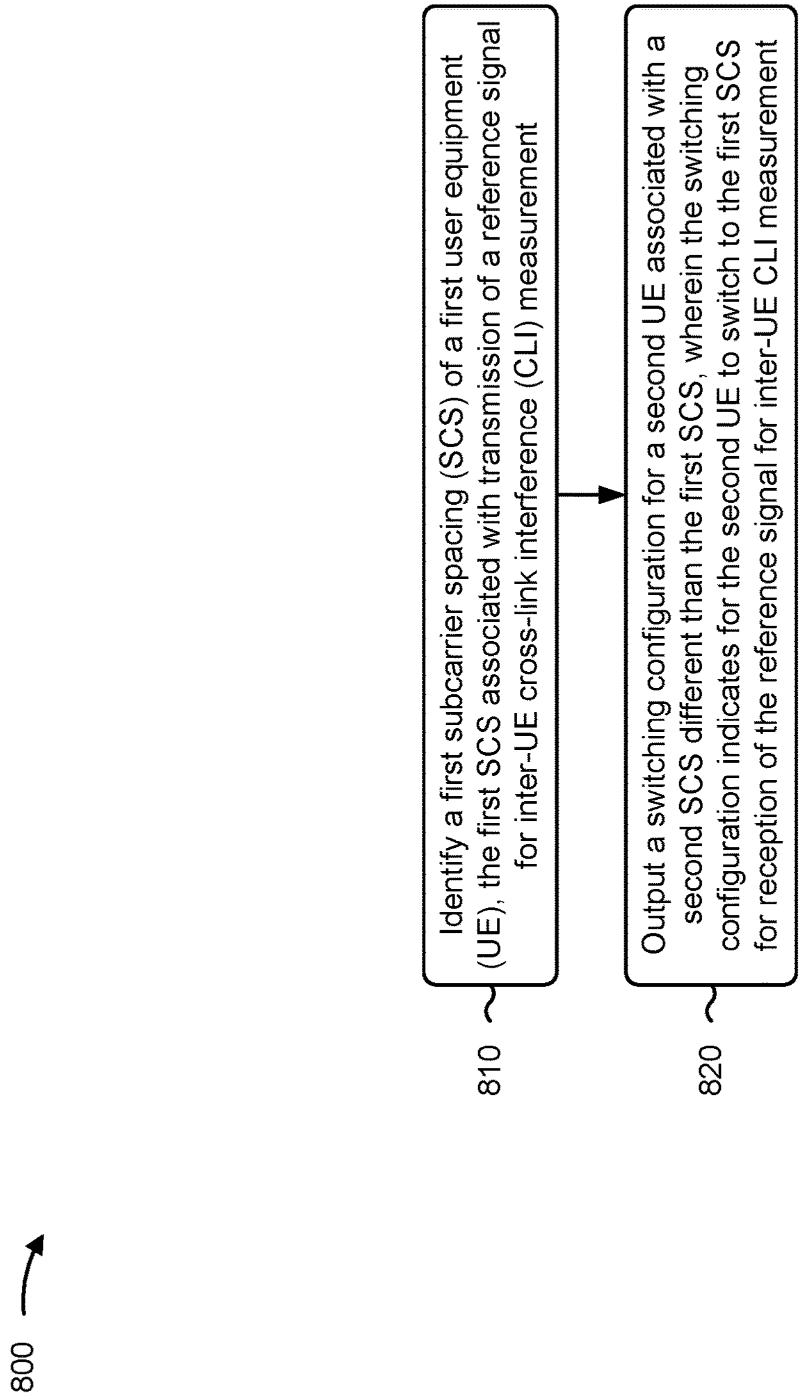
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110, CU 310, DU 330, RU 340, or a combination thereof) performs operations associated with inter-UE CLI measurement.

As shown in FIG. 8, in some aspects, process 800 may include identifying a first SCS of a first UE, the first SCS associated with transmission of a reference signal for inter-UE CLI measurement (block 810). For example, the network node (e.g., using communication manager 150 and/or identification component 1008, depicted in FIG. 10) may identify a first SCS of a first UE, the first SCS associated with transmission of a reference signal for inter-UE CLI measurement, as described above.

As further shown in FIG. 8, in some aspects, process 800 may include outputting a switching configuration for a second UE associated with a second SCS different than the first SCS, wherein the switching configuration indicates for the second UE to switch to the first SCS for reception of the reference signal for inter-UE CLI measurement (block 820). For example, the network node (e.g., using communication manager 150 and/or transmission component 1004, depicted in FIG. 10) may output a switching configuration for a second UE associated with a second SCS different than the first SCS, wherein the switching configuration indicates for the second UE to switch to the first SCS for reception of the reference signal for inter-UE CLI measurement, as described above.

Process 800 may include additional aspects, such as any single aspect or any combination of aspects described below and/or in connection with one or more other processes described elsewhere herein.

In a first aspect, the switching configuration indicates for the second UE to switch an SCS of an active bandwidth part of the second UE to the first SCS.

In a second aspect, alone or in combination with the first aspect, the switching configuration indicates for the second UE to switch to a bandwidth part associated with the first SCS.

In a third aspect, alone or in combination with one or more of the first and second aspects, identifying the first SCS of the first UE further comprises outputting, for the first UE, a configuration of the first SCS.

In a fourth aspect, alone or in combination with one or more of the first through third aspects, identifying the first SCS of the first UE further comprises receiving, from a second network node, information identifying the first SCS of the first UE.

In a fifth aspect, alone or in combination with one or more of the first through fourth aspects, process 800 includes receiving, from the second network node, a configuration associated with the reference signal for inter-UE CLI measurement.

In a sixth aspect, alone or in combination with one or more of the first through fifth aspects, the second network node is a serving network node of the first UE.

In a seventh aspect, alone or in combination with one or more of the first through sixth aspects, the information identifying the first SCS of the first UE is received in a backhaul communication or an over-the-air communication.

In an eighth aspect, alone or in combination with one or more of the first through seventh aspects, the switching configuration indicates a gap associated with the reception of the reference signal for inter-UE CLI measurement.

In a ninth aspect, alone or in combination with one or more of the first through eighth aspects, the reference signal for inter-UE CLI measurement includes a sounding reference signal.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
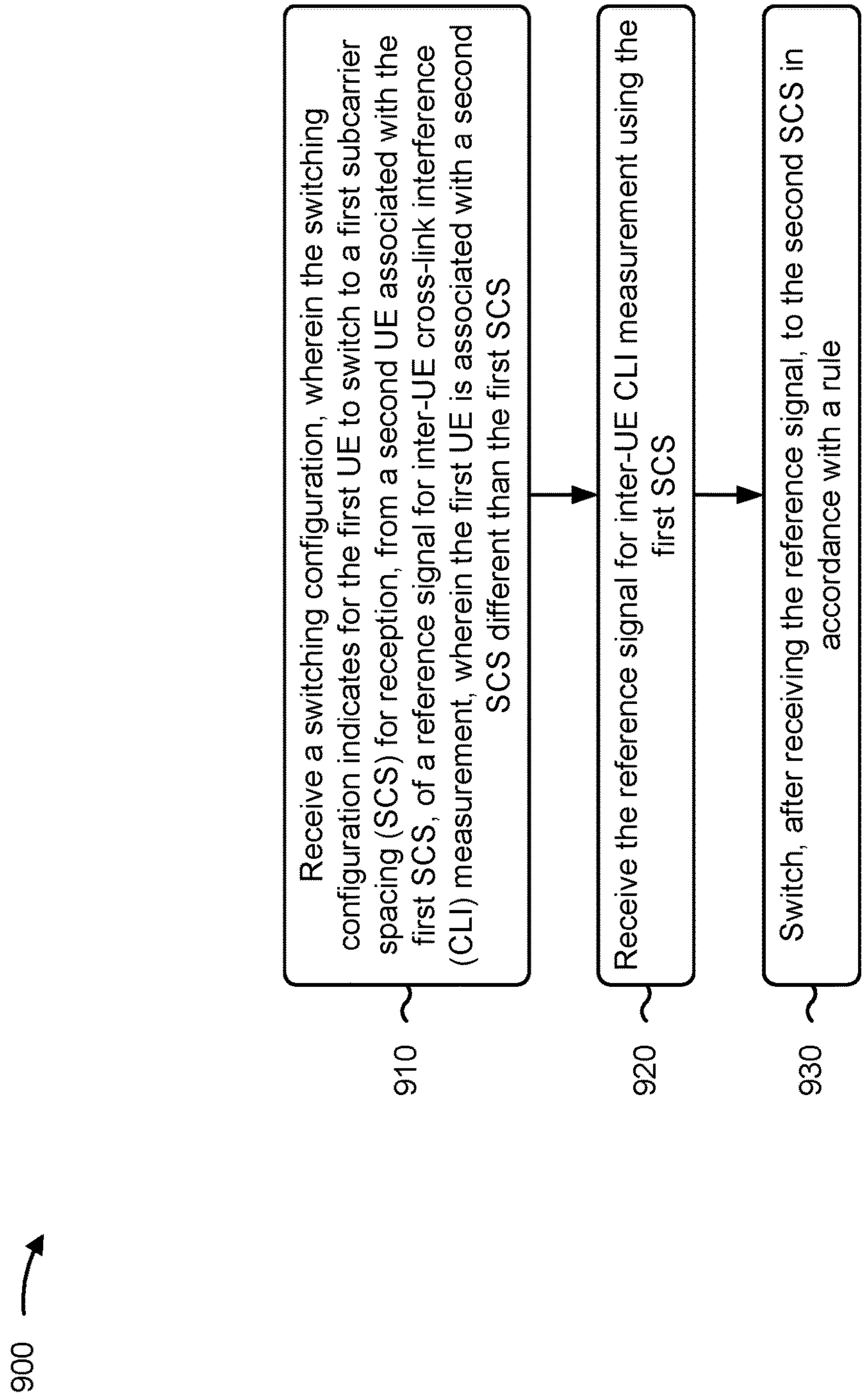
FIG. 9 is a diagram illustrating an example process performed, for example, by a first UE, in accordance with the present disclosure.

FIG. 9 is a diagram illustrating an example process 900 performed, for example, by a first UE, in accordance with the present disclosure. Example process 900 is an example where the first UE (e.g., UE 120) performs operations associated with inter-UE CLI measurement.

As shown in FIG. 9, in some aspects, process 900 may include receiving a switching configuration, wherein the switching configuration indicates for the first UE to switch to a first SCS for reception, from a second UE associated with the first SCS, of a reference signal for inter-UE CLI measurement, wherein the first UE is associated with a second SCS different than the first SCS (block 910). For example, the first UE (e.g., using communication manager 140 and/or reception component 1102, depicted in FIG. 11) may receive a switching configuration, wherein the switching configuration indicates for the first UE to switch to a first SCS for reception, from a second UE associated with the first SCS, of a reference signal for inter-UE CLI measurement, wherein the first UE is associated with a second SCS different than the first SCS, as described above.

As further shown in FIG. 9, in some aspects, process 900 may include receiving the reference signal for inter-UE CLI measurement using the first SCS (block 920). For example, the first UE (e.g., using communication manager 140 and/or reception component 1104, depicted in FIG. 11) may receive the reference signal for inter-UE CLI measurement using the first SCS, as described above.

As further shown in FIG. 9, in some aspects, process 900 may include switching, after receiving the reference signal, to the second SCS in accordance with a rule (block 930). For example, the UE (e.g., using communication manager 140 and/or switching component 1108, depicted in FIG. 11) may switch, after receiving the reference signal, to the second SCS in accordance with a rule, as described above.

Process 900 may include additional aspects, such as any single aspect or any combination of aspects described below and/or in connection with one or more other processes described elsewhere herein.

In a first aspect, process 900 includes switching an SCS of an active bandwidth part of the second UE to the first SCS prior to receiving the reference signal based at least in part on the switching configuration.

In a second aspect, alone or in combination with the first aspect, process 900 includes switching to a bandwidth part associated with the first SCS prior to receiving the reference signal based at least in part on the switching configuration.

In a third aspect, alone or in combination with one or more of the first and second aspects, process 900 includes receiving, prior to receiving the switching configuration, a configuration of the second SCS for the first UE.

In a fourth aspect, alone or in combination with one or more of the first through third aspects, the switching configuration indicates a gap associated with the reception of the reference signal for inter-UE CLI measurement, and receiving the reference signal further comprises receiving the reference signal with the gap prior to or following reception of the reference signal.

In a fifth aspect, alone or in combination with one or more of the first through fourth aspects, the reference signal for inter-UE CLI measurement includes a sounding reference signal.

In a sixth aspect, alone or in combination with one or more of the first through fifth aspects, the rule is specified in a wireless communication specification.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
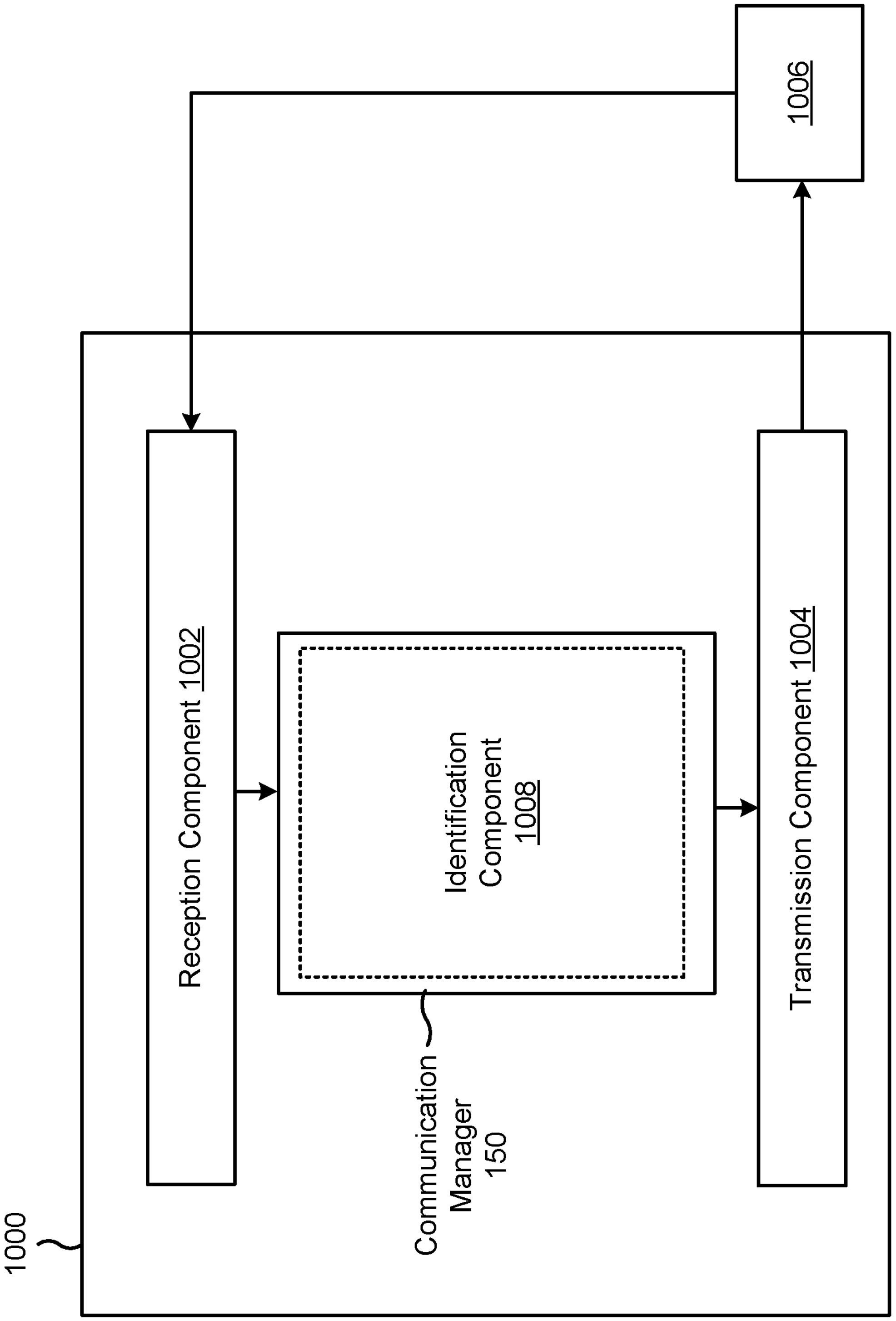
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include an identification component 1008, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The identification component 1008 may identify a first SCS of a first UE, the first SCS associated with transmission of a reference signal for inter-UE CLI measurement. The transmission component 1004 may output a switching configuration for a second UE associated with a second SCS different than the first SCS, wherein the switching configuration indicates for the second UE to switch to the first SCS for reception of the reference signal for inter-UE CLI measurement.

The reception component 1002 may receive, from the second network node, a configuration associated with the reference signal for inter-UE CLI measurement.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
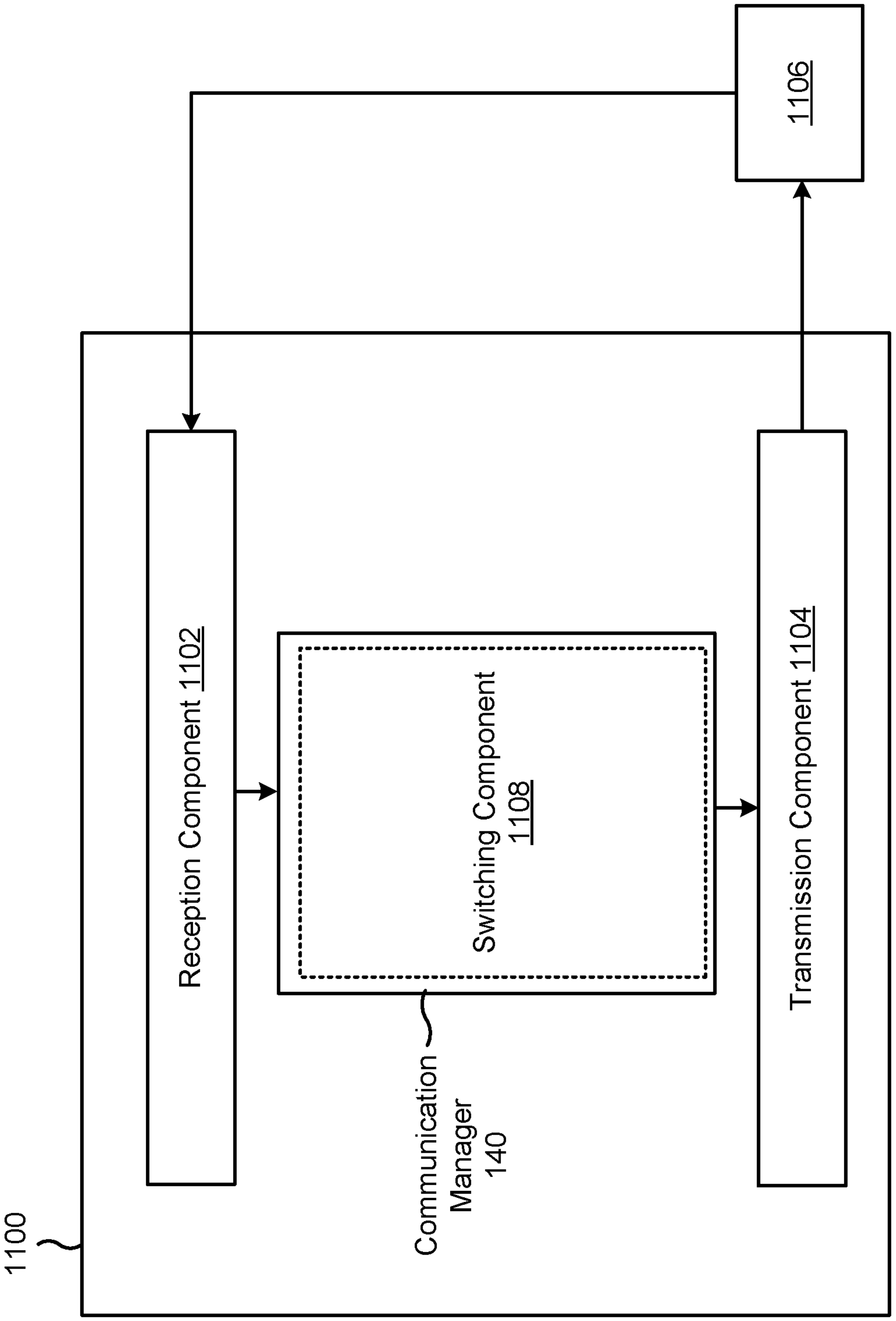
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a switching component 1108, among other examples.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a switching configuration, wherein the switching configuration indicates for the first UE to switch to a first SCS for reception, from a second UE associated with the first SCS, of a reference signal for inter-UE CLI measurement, wherein the first UE is associated with a second SCS different than the first SCS. The reception component 1102 may receive the reference signal for inter-UE CLI measurement using the first SCS. The switching component 1108 may switch, after receiving the reference signal, to the second SCS in accordance with a rule.

The switching component 1108 may switch an SCS of an active bandwidth part of the second UE to the first SCS prior to receiving the reference signal based at least in part on the switching configuration.

The switching component 1108 may switch to a bandwidth part associated with the first SCS prior to receiving the reference signal based at least in part on the switching configuration.

The reception component 1102 may receive, prior to receiving the switching configuration, a configuration of the second SCS for the first UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
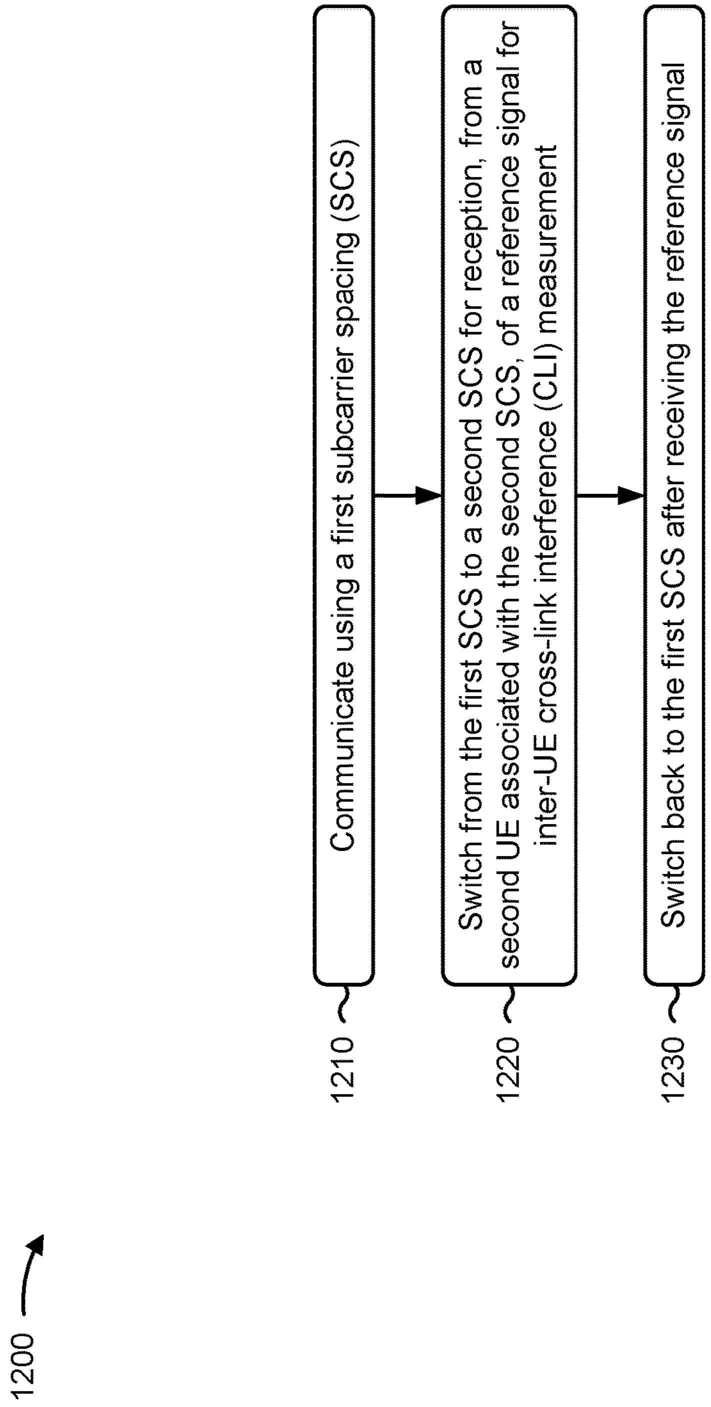
FIG. 12 is a diagram illustrating an example process performed, for example, by a network node, in accordance with the present disclosure.

FIG. 12 is a diagram illustrating an example process 1200 performed, for example, by a first UE, in accordance with the present disclosure. Example process 1200 is an example where the first UE (e.g., UE 120, the victim UE of FIG. 7) performs operations associated with inter-user-equipment cross-link interference measurement.

As shown in FIG. 12, in some aspects, process 1200 may include communicating using a first subcarrier spacing (SCS) (block 1210). For example, the UE (e.g., using communication manager 140 and/or reception component 1202, depicted in FIG. 12) may communicate using a first subcarrier spacing (SCS), as described above, for example, with respect to reference number 710 of FIG. 7.

As further shown in FIG. 12, in some aspects, process 1200 may include switching from the first SCS to a second SCS for reception, from a second UE associated with the second SCS, of a reference signal for inter-UE CLI measurement (block 1220). For example, the first UE (e.g., using communication manager 140 and/or switching component 1108, depicted in FIG. 11) may switch from the first SCS to a second SCS for reception, from a second UE associated with the second SCS, of a reference signal for inter-UE CLI measurement, as described above, for example, with respect to reference number 750 of FIG. 7. In some aspects, the first UE may switch from the first SCS to the second SCS based at least in part on a rule, such as a rule in a wireless communication specification. In some aspects, the first UE may switch from the first SCS to the second SCS based at least in part on a configuration (such as the switching configuration shown by reference number 730 of FIG. 7).

As further shown in FIG. 12, in some aspects, process 1200 may include switching back to the first SCS after receiving the reference signal (block 1230). For example, the first UE (e.g., using communication manager 140 and/or switching component 1108, depicted in FIG. 11) may switch back to the first SCS after receiving the reference signal, as described above, for example, with respect to reference number 760 of FIG. 7. In some aspects, the first UE may switch back to the second SCS in accordance with a rule, such as a rule specified in a wireless communication specification. In some aspects, the first UE may switch back to the second SCS in accordance with a configuration, such as the switching configuration shown by reference number 730 of FIG. 7.

Process 1200 may include additional aspects, such as any single aspect or any combination of aspects described below and/or in connection with one or more other processes described elsewhere herein.

In a first aspect, at least one of switching from the first SCS to the second SCS or switching back to the second SCS is based on a switching configuration, such as the switching configuration shown by reference number 730 of FIG. 7.

In a second aspect, alone or in combination with the first aspect, switching from the first SCS to the second SCS further comprises switching an SCS of an active bandwidth part of the second UE to the first SCS prior to receiving the reference signal based at least in part on the switching configuration.

In a third aspect, alone or in combination with one or more of the first and second aspects, switching from the first SCS to the second SCS further comprises switching to a bandwidth part associated with the second SCS prior to receiving the reference signal based at least in part on the switching configuration.

In a fourth aspect, alone or in combination with one or more of the first through third aspects, process 1200 includes receiving, prior to receiving the switching configuration, a configuration of the second SCS for the first UE, as shown, for example, by reference number 720 of FIG. 7.

In a fifth aspect, alone or in combination with one or more of the first through fourth aspects, the switching configuration indicates a gap associated with the reception of the reference signal for inter-UE CLI measurement, and wherein method further comprises receiving the reference signal with the gap prior to or following reception of the reference signal.

In a sixth aspect, alone or in combination with one or more of the first through fifth aspects, the reference signal for inter-UE CLI measurement includes a sounding reference signal.

In a seventh aspect, alone or in combination with one or more of the first through sixth aspects, at least one of switching to the second SCS or switching back to the first SCS is based on a rule in a wireless communication specification.

In an eighth aspect, alone or in combination with one or more of the first through seventh aspects, switching from the first SCS to the second SCS is further based at least in part on an indication of a resource for the reference signal for inter-UE CLI measurement. For example, a network node (e.g., network node 110) may provide the indication of the resource (which may include, for example, a measurement configuration, an RRC configuration indicating the resource, or the like). In some aspects, the indication may identify the second SCS. The first UE may switch from the first SCS to the second SCS for measurement of the reference signal in the resource (e.g., with a gap before and/or after the resource) in accordance with the rule in the wireless communication specification. In some aspects, the first UE may switch back to the first SCS after the resource in accordance with the rule.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
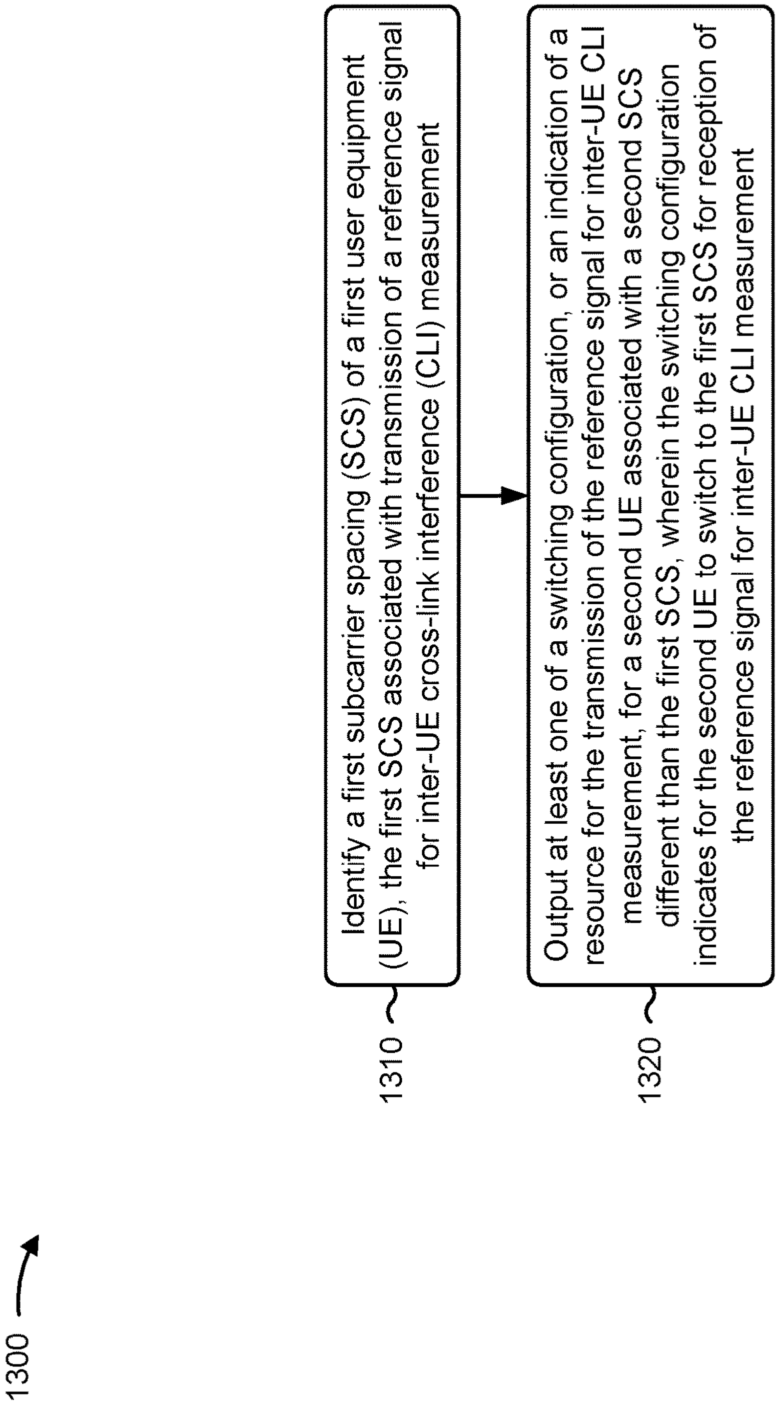
FIG. 13 is a diagram illustrating an example process performed, for example, by a first UE, in accordance with the present disclosure.

FIG. 13 is a diagram illustrating an example process 1300 performed, for example, by a network node, in accordance with the present disclosure. Example process 1300 is an example where the network node (e.g., network node 110, the network node of FIG. 7) performs operations associated with inter-user-equipment cross-link interference measurement.

As shown in FIG. 13, in some aspects, process 1300 may include identifying a first subcarrier spacing (SCS) of a first user equipment (UE), the first SCS associated with transmission of a reference signal for inter-UE cross-link interference (CLI) measurement (block 1310). For example, the network node (e.g., using communication manager 150 and/or identification component 1008, depicted in FIG. 10) may identify a first SCS of a first UE, the first SCS associated with transmission of a reference signal for inter-UE CLI measurement, as described above.

As further shown in FIG. 13, in some aspects, process 1300 may include outputting at least one of a switching configuration, or an indication of a resource for the transmission of the reference signal for inter-UE CLI measurement, for a second UE associated with a second SCS different than the first SCS, wherein the switching configuration indicates for the second UE to switch to the first SCS for reception of the reference signal for inter-UE CLI measurement (block 1320). For example, the network node (e.g., using communication manager 150 and/or transmission component 1004, depicted in FIG. 10) may output at least one of a switching configuration, or an indication of a resource for the transmission of the reference signal for inter-UE CLI measurement, for a second UE associated with a second SCS different than the first SCS, wherein the switching configuration indicates for the second UE to switch to the first SCS for reception of the reference signal for inter-UE CLI measurement, as described above. For example, in some aspects, the network node may output a switching configuration as shown by reference number 730 of FIG. 7. In some other aspects, the network node may output (e.g., transmit to the second UE, provide to another network node for transmission to the UE, etc.) an indication of a resource for reception of the reference signal for inter-UE CLI measurement, such that the second UE can switch to the first SCS for reception (e.g., measurement of the reference signal in the resource (in some aspects, with a gap before and/or after the resource) in accordance with a rule specified in a wireless communication specification. In some aspects, the second UE may switch back to the second SCS after reception (e.g., measurement) of the reference signal in the resource.

Process 1300 may include additional aspects, such as any single aspect or any combination of aspects described below and/or in connection with one or more other processes described elsewhere herein.

In a first aspect, the switching configuration indicates for the second UE to switch an SCS of an active bandwidth part of the second UE to the first SCS.

In a second aspect, alone or in combination with the first aspect, the switching configuration indicates for the second UE to switch to a bandwidth part associated with the first SCS.

In a third aspect, alone or in combination with one or more of the first and second aspects, the identifying the first SCS of the first UE further comprises outputting, for the first UE, a configuration of the first SCS.

In a fourth aspect, alone or in combination with one or more of the first through third aspects, the identifying the first SCS of the first UE further comprises receiving, from a second network node, information identifying the first SCS of the first UE.

In a fifth aspect, alone or in combination with one or more of the first through fourth aspects, process 1300 includes receiving, from the second network node, a configuration associated with the reference signal for inter-UE CLI measurement.

In a sixth aspect, alone or in combination with one or more of the first through fifth aspects, the second network node is a serving network node of the first UE.

In a seventh aspect, alone or in combination with one or more of the first through sixth aspects, the information identifying the first SCS of the first UE is received in a backhaul communication or an over-the-air communication.

In an eighth aspect, alone or in combination with one or more of the first through seventh aspects, the switching configuration indicates a gap associated with the reception of the reference signal for inter-UE CLI measurement.

In a ninth aspect, alone or in combination with one or more of the first through eighth aspects, the reference signal for inter-UE CLI measurement includes a sounding reference signal.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The following provides an overview of some Aspects of the present disclosure:

Aspect 1: A method of wireless communication performed by a first user equipment (UE), comprising: communicating using a first subcarrier spacing (SCS); switching from the first SCS to a second SCS for reception, from a second UE associated with the second SCS, of a reference signal for inter-UE cross-link interference (CLI) measurement; and switching back to the first SCS after receiving the reference signal.

Aspect 2: The method of Aspect 1, wherein at least one of switching from the first SCS to the second SCS or switching back to the second SCS is based on a switching configuration.

Aspect 3: The method of Aspect 2, wherein switching from the first SCS to the second SCS further comprises switching an SCS of an active bandwidth part of the second UE to the first SCS prior to receiving the reference signal based at least in part on the switching configuration.

Aspect 4: The method of Aspect 2, wherein switching from the first SCS to the second SCS further comprises switching to a bandwidth part associated with the second SCS prior to receiving the reference signal based at least in part on the switching configuration.

Aspect 5: The method of Aspect 2, further comprising receiving, prior to receiving the switching configuration, a configuration of the second SCS for the first UE.

Aspect 6: The method of Aspect 2, wherein the switching configuration indicates a gap associated with the reception of the reference signal for inter-UE CLI measurement, and wherein method further comprises receiving the reference signal with the gap prior to or following reception of the reference signal.

Aspect 7: The method of any of Aspects 1-6, wherein the reference signal for inter-UE CLI measurement includes a sounding reference signal.

Aspect 8: The method of any of Aspects 1-7, wherein at least one of switching to the second SCS or switching back to the first SCS is based on a rule in a wireless communication specification.

Aspect 9: The method of Aspect 8, wherein switching from the first SCS to the second SCS is further based at least in part on an indication of a resource for the reference signal for inter-UE CLI measurement.

Aspect 10: A method of wireless communication performed by a network node, comprising: identifying a first subcarrier spacing (SCS) of a first user equipment (UE), the first SCS associated with transmission of a reference signal for inter-UE cross-link interference (CLI) measurement; and outputting at least one of a switching configuration, or an indication of a resource for the transmission of the reference signal for inter-UE CLI measurement, for a second UE associated with a second SCS different than the first SCS, wherein the switching configuration indicates for the second UE to switch to the first SCS for reception of the reference signal for inter-UE CLI measurement.

Aspect 11: The method of Aspect 10, wherein the switching configuration indicates for the second UE to switch an SCS of an active bandwidth part of the second UE to the first SCS.

Aspect 12: The method of any of Aspects 10-11, wherein the switching configuration indicates for the second UE to switch to a bandwidth part associated with the first SCS.

Aspect 13: The method of any of Aspects 10-12, wherein the identifying the first SCS of the first UE further comprises outputting, for the first UE, a configuration of the first SCS.

Aspect 14: The method of any of Aspects 10-13, wherein the identifying the first SCS of the first UE further comprises receiving, from a second network node, information identifying the first SCS of the first UE.

Aspect 15: The method of Aspect 14, further comprising receiving, from the second network node, a configuration associated with the reference signal for inter-UE CLI measurement.

Aspect 16: The method of Aspect 14, wherein the second network node is a serving network node of the first UE.

Aspect 17: The method of Aspect 14, wherein the information identifying the first SCS of the first UE is received in a backhaul communication or an over-the-air communication.

Aspect 18: The method of any of Aspects 10-17, wherein the switching configuration indicates a gap associated with the reception of the reference signal for inter-UE CLI measurement.

Aspect 19: The method of any of Aspects 10-18, wherein the reference signal for inter-UE CLI measurement includes a sounding reference signal.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:

one or more memories; and one or more processors, coupled to the one or more memories, configured to: communicate using a first subcarrier spacing (SCS) of an active bandwidth part of a sub-band full duplex (SBFD) configuration;

receive, from a network node, a switching configuration for inter-UE cross-link interference (CLI) measurement, the switching configuration indicating time resources and frequency resources in which a reference signal for the inter-UE CLI measurement is transmitted, including a second bandwidth part and a second SCS of the second bandwidth part, and the switching configuration indicating a gap associated with reception of the reference signal for inter-UE CLI measurement, the gap being a time interval of a part of a symbol;

switch from the first SCS to the second SCS, the second SCS for reception, from a second UE associated with the second SCS, of the reference signal for the inter-UE CLI measurement;

switch back to the first SCS after receiving the reference signal; and communicate using the first SCS.

2. The first UE of claim 1, wherein at least one of switching from the first SCS to the second SCS or switching back to the first SCS is based on the switching configuration.

3. The first UE of claim 2, wherein the one or more processors, to switch from the first SCS to the second SCS, are configured to switch an SCS of the active bandwidth part of the second UE to the first SCS prior to receiving the reference signal based at least in part on the switching configuration.

4. The first UE of claim 2, wherein the one or more processors, to switch from the first SCS to the second SCS, are configured to switch to a bandwidth part associated with the second SCS prior to receiving the reference signal based at least in part on the switching configuration.

5. The first UE of claim 2, wherein the one or more processors are further configured to receive, prior to receiving the switching configuration, a configuration of the second SCS for the first UE.

6. The first UE of claim 2, wherein the one or more processors are further configured to receive the reference signal with the gap prior to or following reception of the reference signal.

7. The first UE of claim 1, wherein the reference signal for inter-UE CLI measurement includes a sounding reference signal.

8. The first UE of claim 1, wherein at least one of switching to the second SCS or switching back to the first SCS is based on a rule in a wireless communication specification.

9. The first UE of claim 8, wherein switching from the first SCS to the second SCS is further based at least in part on an indication of a resource for the reference signal for inter-UE CLI measurement.

10. A network node for wireless communication, comprising:
one or more memories; and
one or more processors, coupled to the one or more memories, configured to:
identify a first subcarrier spacing (SCS) of a first user equipment (UE), the first SCS associated with transmission of a reference signal for inter-UE cross-link interference (CLI) measurement in a first bandwidth part of a sub-band full duplex (SBFD) configuration; and
output at least one of a switching configuration, or an indication of a resource for the transmission of the reference signal for inter-UE CLI measurement, for a second UE associated with a second SCS different than the first SCS, wherein the switching configuration indicates for the second UE to switch from a second bandwidth part to the first bandwidth part associated with the first SCS for reception of the reference signal for inter-UE CLI measurement, indicates a gap associated with the reception of the reference signal for inter-UE CLI measurement, and indicates time resources and frequency resources in which a reference signal for the inter-UE CLI measurement is transmitted, wherein the time resources and the frequency resources include the second bandwidth part and a second SCS of the second bandwidth part, and wherein the gap includes being a time interval of a part of a symbol.

11. The network node of claim 10, wherein the switching configuration indicates for the second UE to switch an SCS of an active bandwidth part of the second UE to the first SCS, the first bandwidth part comprising the active bandwidth part.

12. The network node of claim 10, wherein the switching configuration indicates for the second UE to switch to the first bandwidth part associated with the first SCS.

13. The network node of claim 10, wherein the identifying the first SCS of the first UE further comprises outputting, for the first UE, a configuration of the first SCS.

14. The network node of claim 10, wherein the identifying the first SCS of the first UE further comprises receiving, from a second network node, information identifying the first SCS of the first UE.

15. The network node of claim 14, wherein the one or more processors are further configured to receive, from the second network node, a configuration associated with the reference signal for inter-UE CLI measurement.

16. The network node of claim 14, wherein the second network node is a serving network node of the first UE.

17. The network node of claim 14, wherein the information identifying the first SCS of the first UE is received in a backhaul communication or an over-the-air communication.

18. The network node of claim 10, wherein the reference signal for inter-UE CLI measurement includes a sounding reference signal.

19. A method of wireless communication performed by a first user equipment (UE), comprising:
communicating using a first subcarrier spacing (SCS) of an active bandwidth part of a sub-band full duplex (SBFD) configuration;
receiving, from a network node, a switching configuration for inter-UE cross-link interference (CLI) measurement, the switching configuration indicating time resources and frequency resources in which a reference signal for the inter-UE CLI measurement is transmitted, including a second bandwidth part and a second SCS of the second bandwidth part, and the switching configuration indicating a gap associated with reception of the reference signal for inter-UE CLI measurement, the gap being a time interval of a part of a symbol;
switching from the first SCS to the second SCS, the second SCS for reception, from a second UE associated with the second SCS, of the reference signal for the inter-UE CLI measurement;
switching back to the first SCS after receiving the reference signal; and
communicating using the first SCS.

20. The method of claim 19, wherein at least one of switching from the first SCS to the second SCS or switching back to the first SCS is based on a switching configuration.

21. The method of claim 20, wherein switching from the first SCS to the second SCS further comprises switching an SCS of the active bandwidth part of the second UE to the first SCS prior to receiving the reference signal based at least in part on the switching configuration.

22. The method of claim 20, wherein switching from the first SCS to the second SCS further comprises switching to a bandwidth part associated with the second SCS prior to receiving the reference signal based at least in part on the switching configuration.

23. The method of claim 20, further comprising receiving, prior to receiving the switching configuration, a configuration of the second SCS for the first UE.

24. The method of claim 20, wherein the method further comprises receiving the reference signal with the gap prior to or following reception of the reference signal.

25. A method of wireless communication performed by a network node, comprising:
identifying a first subcarrier spacing (SCS) of a first user equipment (UE), the first SCS associated with transmission of a reference signal for inter-UE cross-link interference (CLI) measurement in a first bandwidth part of a sub-band full duplex (SBFD) configuration; and
outputting at least one of a switching configuration, or an indication of a resource for the transmission of the reference signal for inter-UE CLI measurement, for a second UE associated with a second SCS different than the first SCS, wherein the switching configuration indicates for the second UE to switch from a second bandwidth part to the first bandwidth part associated with the first SCS for reception of the reference signal for inter-UE CLI measurement, indicates a gap associated with the reception of the reference signal for inter-UE CLI measurement, and indicates time resources and frequency resources in which a reference signal for the inter-UE CLI measurement is transmitted, wherein the time resources and the frequency resources include the second bandwidth part and a second SCS of the second bandwidth part, and wherein the gap being a time interval of a part of a symbol.

26. The method of claim 25, wherein the switching configuration indicates for the second UE to switch an SCS of an active bandwidth part of the second UE to the first SCS, the first bandwidth part comprising the active bandwidth part.

27. The method of claim 25, wherein the switching configuration indicates for the second UE to switch to the first bandwidth part associated with the first SCS.

28. The method of claim 25, wherein the identifying the first SCS of the first UE further comprises outputting, for the first UE, a configuration of the first SCS.

29. The method of claim 25, wherein the identifying the first SCS of the first UE further comprises receiving, from a second network node, information identifying the first SCS of the first UE.

30. The method of claim 29, further comprising receiving, from the second network node, a configuration associated with the reference signal for inter-UE CLI measurement.

* * * * *